(12) United States Patent
Selevan et al.

(10) Patent No.: US 11,231,150 B2
(45) Date of Patent: Jan. 25, 2022

(54) DEVICES AND METHODS FOR IMPACT DETECTION AND ASSOCIATED DATA TRANSMISSION

(71) Applicants: Adam J Selevan, Laguna Beach, CA (US); Daniel J Selevan, Laguna Beach, CA (US); James R Selevan, Laguna Beach, CA (US)

(72) Inventors: Adam J Selevan, Laguna Beach, CA (US); Daniel J Selevan, Laguna Beach, CA (US); James R Selevan, Laguna Beach, CA (US)

( * ) Notice: Subject to any disclaimer, the term of this patent is extended or adjusted under 35 U.S.C. 154(b) by 0 days.

(21) Appl. No.: 17/145,378

(22) Filed: Jan. 10, 2021

(65) Prior Publication Data

US 2021/0156529 A1 May 27, 2021

Related U.S. Application Data

(63) Continuation-in-part of application No. 16/775,055, filed on Jan. 28, 2020, which is a continuation of application No. 15/893,420, filed on Feb. 9, 2018, now Pat. No. 10,551,014, which is a continuation-in-part of application No. 29/613,191,
(Continued)

(51) Int. Cl.
| | |
|---|---|
| *F21L 4/08* | (2006.01) |
| *B65D 25/20* | (2006.01) |
| *B65D 25/30* | (2006.01) |
| *F21L 2/00* | (2006.01) |
| *F21V 23/04* | (2006.01) |
| *H02J 7/00* | (2006.01) |
| *F21Y 115/10* | (2016.01) |

(52) U.S. Cl.
CPC ............ *F21L 4/08* (2013.01); *B65D 25/20* (2013.01); *B65D 25/30* (2013.01); *F21L 2/00* (2013.01); *F21V 23/0435* (2013.01); *H02J 7/00034* (2020.01); *H02J 7/0044* (2013.01); *F21Y 2115/10* (2016.08)

(58) Field of Classification Search
CPC .... F21L 4/08; F21L 2/00; H02J 7/0034; H02J 7/0044; B65D 25/20; B65D 25/30; F21V 23/0435; F21Y 2115/10
See application file for complete search history.

(56) References Cited

U.S. PATENT DOCUMENTS

| | | | | |
|---|---|---|---|---|
| 7,106,179 B1* | 9/2006 | Dueker | ..................... | B60Q 1/52 340/321 |
| 2011/0298603 A1* | 12/2011 | King | ..................... | G08G 1/042 340/436 |
| 2016/0144817 A1* | 5/2016 | Chambers | .............. | G08G 1/205 340/436 |

* cited by examiner

Primary Examiner — Mary Ellen Bowman

(57) ABSTRACT

Herein is described an invention that efficiently detects and reports vehicle impact with fixed or temporary roadway safety devices. A multitude of sensors may report road events via a single cellular or fiber optic gateway thereby substantially reducing acquisition and recurring cost. The use of a mesh network to connect these sensors provides low duty cycle monitoring. Extremely low-power circuity that allows for multi-year battery life of small, light-weight solar photovoltaic panel is achievable through precise node-to-node timing. Radio transmission and reception is limited to a few milliseconds in each second. The novel mesh network architecture does not utilize an external coordinating signal, timing signal, or connection. Synchrony is maintained internal to the mesh network. Duty cycles of less than approximately 0.01% are achievable.

20 Claims, 15 Drawing Sheets

Related U.S. Application Data filed on Aug. 8, 2017, now Pat. No. Des. 854,438, and a continuation-in-part of application No. 29/593,694, filed on Feb. 10, 2017, now Pat. No. Des. 854,437.

(60) Provisional application No. 62/959,184, filed on Jan. 10, 2020, provisional application No. 62/959,847, filed on Jan. 10, 2020, provisional application No. 62/457,638, filed on Feb. 10, 2017.

FIG. 10

DEVICES AND METHODS FOR IMPACT DETECTION AND ASSOCIATED DATA TRANSMISSION

CROSS-REFERENCE TO RELATED APPLICATIONS

This application claims the benefit of priority under 35 U.S.C. § 119(e) to U.S. Provisional Patent Application Nos. 62/959,184 filed Jan. 10, 2020, and titled "Devices and Methods for Impact Detection and Associated Data Transmission" and 62/959,847, filed Jan. 10, 2020, and titled "Devices and Methods for Impact Detection and Associated Data Transmission the entireties of which are incorporated herein by reference. This application is a continuation-in-part of U.S. application Ser. No. 16/775,055, filed Jan. 28, 2020, and titled "Portable Electronic Flare Carrying Case and System, which is a continuation of co-pending U.S. application Ser. No. 15/893,420 filed Feb. 9, 2018 and issued as U.S. Pat. No. 10,551,014 on Feb. 4, 2020, which claims the benefit of priority under 35 U.S.C. § 119(e) to U.S. Provisional Patent Application No. 62/457,638 filed Feb. 10, 2017 and is also a continuation-in-part of: a) U.S. patent application Ser. No. 29/593,694 filed Feb. 10, 2017 and issued as U.S. Pat. No. D854,437 on Jul. 23, 2019 and b) U.S. patent application Ser. No. 29/613,191 filed Aug. 8, 2017 and issued as U.S. Pat. No. D854,438 on Jul. 23, 2019, the entireties of which are incorporated herein by reference. Any and all applications for which a foreign or domestic priority claim is identified in the Application Data Sheet as filed with the present application are hereby incorporated by reference under 37 CFR 1.57.

FIELD OF THE INVENTION

The present invention relates generally to the fields of electronics, traffic engineering and public safety and more particularly to devices and methods for detecting when an object has been impacted (e.g., by a vehicle) and for transmitting data relating to such impact and/or data relating to the device itself, to one or more remotely located receiving locations.

BACKGROUND

Pursuant to 37 CFR 1.71(e), this patent document contains material which is subject to copyright protection and the owner of this patent document reserves all copyright rights whatsoever.

It is sometimes desirable to detect when an object has been impacted by a vehicle or other moving object and to notify appropriate authorities when such an impact event occurs. For example, in road construction areas, temporary concrete barriers (e.g., K-Rails also referred to as "Jersey rails") are sometimes positioned at locations along the roadway and impact attenuating devices (e.g., sand filled containers, collapsible structures, crash cushions or other impact attenuators) are placed adjacent to the concrete barrier to reduce the impact or rate of deceleration of a vehicle crashing into the concrete barrier. When such impact attenuating devices are struck by a vehicle it is desirable to notify police and/or other emergency service agency, roadway maintenance agency, etc. of such event. The need for impact detection is not limited to construction areas. Concrete barriers often designate a highway exit or protect other structures such as bridge abutments, signage, cable barriers, etc. Wherever an immobile structure is placed on the roadway it must include a protection device, an attenuator or crash cushion, to protect drivers and vehicles from accidental impact.

Nuisance impacts are quite frequent. Drivers unfamiliar with an area, or impaired, or distracted who try to exit across traffic, for example, may inadvertently strike a crash cushion in their attempt. A minor impact may leave the vehicle intact and able to back up and drive away. Under this scenario no one is notified of the impact, yet the crash cushion may be compromised and unsafe for a second impact. This safety device should be inspected after each minor impact yet there is no mechanism for maintenance crews to be notified. The introduction of low-cost accelerometers and radio technology now allows for immediate notification at low cost.

The prior art has included U.S. Pat. No. 6,539,175 (Geary et al.) which describes a collision sensor that detects when a vehicle collides with a highway crash barrier and sends a radio frequency signal to one or more remote locations when the sensor detects a collision.

SUMMARY

The innovations described in the claims each have several aspects, no single one of which is solely responsible for the desirable attributes. Without limiting the scope of the claims, some prominent features of this disclosure will now be briefly described.

Federal and state roadways are designed for maximum, achievable, efficiency and safety. Safety devices are placed where incidents, including impact, may occur. Engineers specify during the design phase that a particular device must be placed at a particular location. If that device is not functioning to specification, then it might as well not be there. Such was the case in March of 2018 when a vehicle impacted a crash cushion placed at the end of a concrete barrier. This attenuator, as crash cushions are referred to, was located in the San Francisco Bay area. Unfortunately, this protective device had been struck 11 days earlier in what is known as a "nuisance" impact. Nuisance impacts are minor; the vehicle is able to drive away. A major impact, one that disables the vehicle, is well documented as law enforcement, maintenance crews, and medical first responders are all called to the scene. Nuisance impacts are pernicious in that the event may go unreported. Minor impact to a crash cushion designed to deform or collapse to protect the driver may compromise the safety device thereby leading to a failure to protect the next vehicle that strikes it. Such was the case in San Francisco that led to a fatality.

Reporting of minor nuisance impacts is haphazard at best. Law enforcement, maintenance crews, or the driving public might notice that the asset has been struck. When is uncertain. Reporting is uncertain. Hence, a device specified by the design engineer to protect drivers may not be functional. Many thousands of dollars were spent to place the device there, lives are at stake, and cost and liability may ensue.

Countering the need to monitor road safety assets is the complexity and cost to do so. The inventions described herein represents a low-cost, simple-to-install device, system and method to address this problem.

In accordance with the present invention, there are provided devices and methods for detecting when an object has been impacted and transmitting data relating to such impact event and/or other data to one or more remote locations.

An aspect of the invention is directed to a device configured for attachment to or positioning near a crash attenuator to detect a force applied to a crash attenuator, a plurality of devices forming an array, the array and a gateway forming a local network, each device comprising: at least one impact sensor to sense an impact on the crash attenuator, the at least one impact sensor configured to send indications of the impact; a transmitter circuitry; and a processor and memory storing executable instructions that when executed cause the processor to receive the indications of the impact from the at least one impact sensor and transmit to one or more remote locations via the transmitter circuitry, messages that include at least event data responsive to the received indications of the impact; wherein the transmitter circuitry is operative to automatically transmit radio frequency signals from one device to one or more neighbor devices in the array of devices, without reference to a common reference signal, such that each device in the array of devices synchronizes transmit and receive time intervals and establishes low-power connectivity with at least one neighbor device in the array of devices to pass status through the array to be received by the gateway.

The gateway comprises sensing circuitry and a cellular or fiber optic connection to a cloud network. The gateway comprises an impact sensor and cellular or fiber optic connectivity. Establishing low-power connectivity comprises performing low-duty cycle transmit and receive periods to coordinate clock signals and synchronize the transmit and receive periods using a mesh technology, wherein each device is in quiescent low-power sleep mode when not transmitting or receiving to minimizing power consumption. Establishing the low-power connectivity further comprises transmitting a notification upon impact to an awake neighbor device that is configured to receive and forward the message. The processor, upon interrupt notification of impact by the impact sensor, is configured to sample acceleration data at the moment of impact at a frequency of many times per second for several seconds to either process locally on the device, or transmit the sampled acceleration data to a cloud server for post-event processing, The cloud server or the device collects the sampled acceleration data and calculates an area-under-the-curve of time and magnitude of acceleration based on the collected acceleration data. The cloud server or the device determines a true impact by comparing the area-under-the-curve of time and magnitude of acceleration to a first adjustable threshold and comparing and a maximum value of acceleration to a second adjustable threshold. A mesh network comprises the array of devices, wherein the mesh network further comprises a gateway. The gateway is configured to connect the mesh network to a cloud server using fiber optics.

Aspects of the disclosure are directed to a system to detect an impact on a crash cushion, the system comprising: a plurality of devices forming an array, each device of the array of devices configured for attachment to or positioning near a crash attenuator to detect a force applied to a crash attenuator, each device comprising at least one impact sensor to sense an impact on the crash attenuator, the at least one impact sensor configured to send indications of the impact, a transmitter circuitry and a processor and memory storing executable instructions that when executed cause the processor to receive the indications of the impact from the at least one impact sensor and transmit to one or more remote locations via the transmitter circuitry, messages that include at least event data responsive to the received indications of the impact; and a gateway apparatus configured to receive radio frequency signals from the array of devices and communicate the messages to a cloud server; wherein the transmitter circuitry is operative to automatically transmit the radio frequency signals from one device to one or more neighbor devices in the array of devices, without reference to a common reference signal, such that each device in the array of devices synchronizes transmit and receive time intervals and establishes low-power connectivity with at least one neighbor device in the array of devices to pass status through the array to be received by the gateway.

The gateway and the array of devices form a local network. The cloud server is configured to analyze the event data. Establishing low-power connectivity comprises performing low-duty cycle transmit and receive periods to coordinate clock signals and synchronize the transmit and receive periods using a mesh technology, wherein each device is in quiescent low-power sleep mode when not transmitting or receiving to minimizing power consumption. Establishing the low-power connectivity further comprises transmitting a notification upon impact to an awake neighbor device that is configured to receive and forward the message.

The processor, upon interrupt notification of impact by the impact sensor, is configured to sample acceleration data at the moment of impact at a frequency of many times per second for several seconds to either process locally on the device, or transmit the sampled acceleration data to a cloud server for post-event processing. The cloud server or the device collects the sampled acceleration data and calculates an area-under-the-curve of time and magnitude of acceleration based on the collected acceleration data. The cloud server or the device determines a true impact by comparing the area-under-the-curve of time and magnitude of acceleration to a first adjustable threshold and comparing and a maximum value of acceleration to a second adjustable threshold. A mesh network comprises the array of devices, wherein the mesh network further comprises the gateway. The at least one impact sensor comprises an accelerometer.

Still further aspects and details of the present invention will be understood upon reading of the detailed description and examples set forth here below.

BRIEF DESCRIPTION OF THE DRAWINGS

The following detailed description and examples are provided for the purpose of non-exhaustively describing some, but not necessarily all, examples or embodiments of the invention, and shall not limit the scope of the invention in any way.

FIG. 10 is an electrical diagram of an example I/O expander and external RAM memory device used in devices of the present disclosure.

DETAILED DESCRIPTION

The following detailed description and the accompanying figures to which it refers are intended to describe some, but not necessarily all, examples, or embodiments of the invention. The described embodiments are to be considered in all respects as being illustrative but not restrictive. The contents of this detailed description and the accompanying figures do not limit the scope of the invention in any way. The sensors incorporate electronics that may be characterized as a device or network node and will be referred to in either way.

Figure 1:
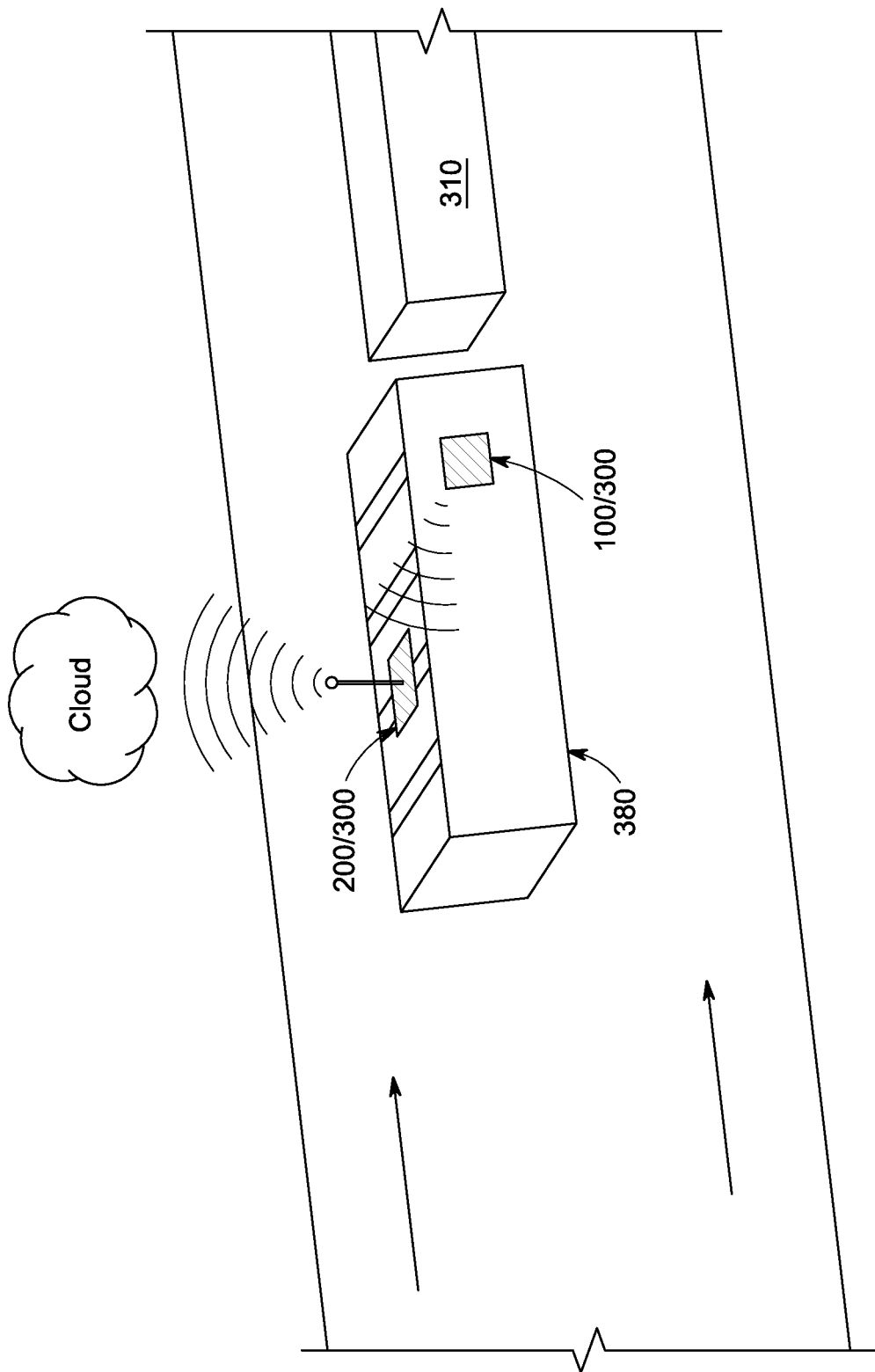
FIG. 1 is an example of a schematic view of one embodiment of a device (also referred to as a node) of the present invention attached to a crash cushion protecting a concrete barrier.

FIG. 1 shows, in schematic fashion, one non-limiting embodiment of a device (node) 100/300 of the present invention. The device 100/300 shown in FIG. 1 generally comprises at least one housing 300 which has, thereon or therein, a power source, at least one sensor configured to detect an impact, at least one processor, an optional camera, at least one transmitter and at least one optional signal emitter. In some embodiments, the device 100/300 may include a connector useable for attaching the device 100/300 to a potentially impactable object 380 or other support structure. These components of the device are interconnected by wired or wireless circuitry in a manner well understood in the art.

Figure 2:
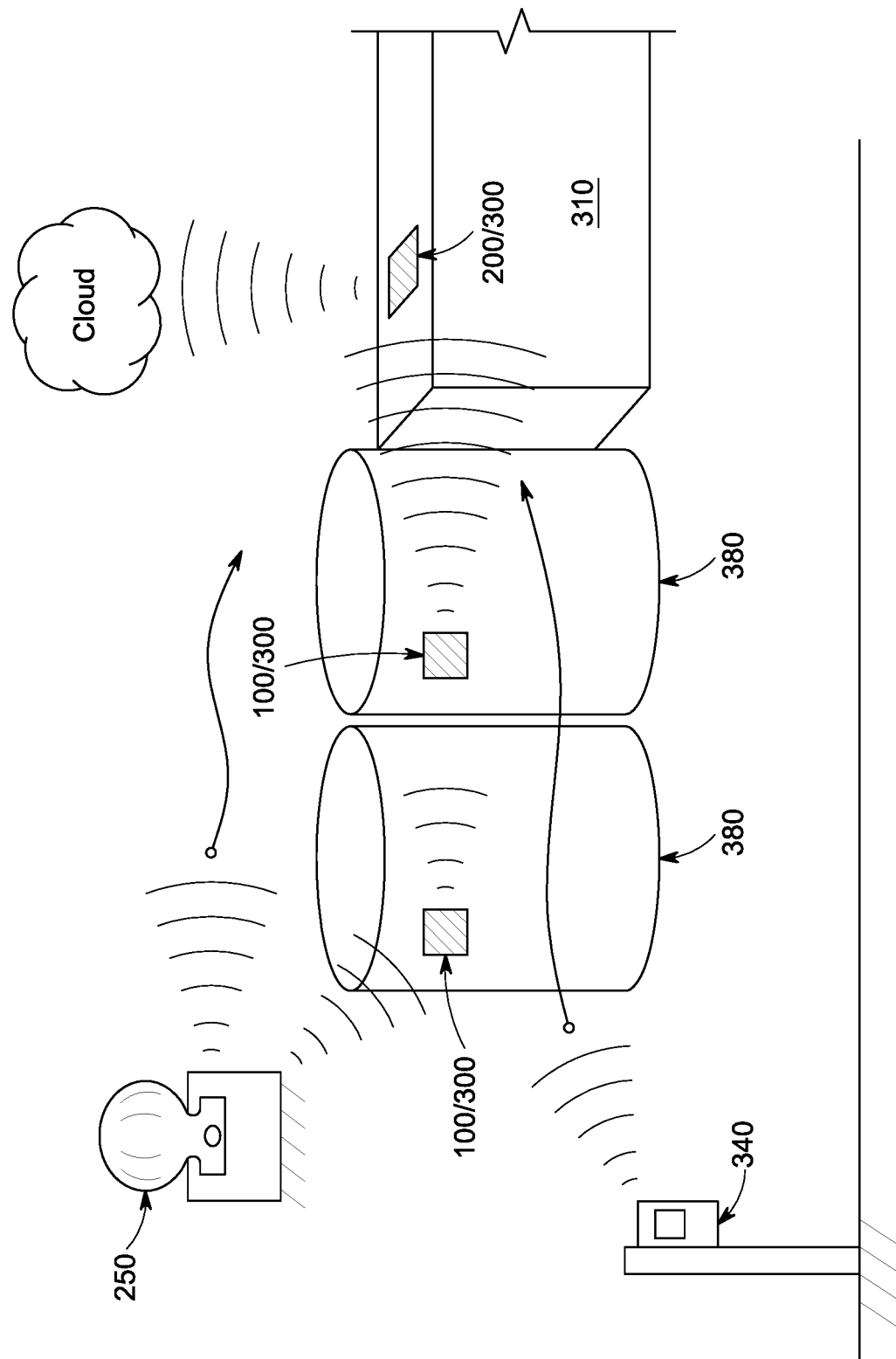
FIG. 2 is an example of an alternative embodiment where the sensor node is mounted on the cushion while the gateway is mounted separate from the cushion. Additional sensors are positioned in alternative enclosures such as a lamp. A camera can be included in the mesh network to capture video of an event.

In general, the housing 300 may comprise at least one suitable housing, enclosure, frame, case, body, plate, panel, board, member, bag, connective lattice or other structure or article upon or in which the components of the device and associated circuitry/wiring may be mounted. The systems will include a node sensor 100 that is able to detect vibration, motion, tilt, acceleration/deceleration, temperature, humidity, etc. In addition, a second sensor, referred to as a gateway 200, will include the aforementioned capability found in node 100, but will include the additional feature of being able to connect via either cellular or fiber optic network to a Cloud system and thus the internet. For example, as illustrated in FIG. 2, an alternative embodiment of a device 100/300 comprises a first portion 100/300 and a second portion 200/300. The first portion 100/300 can include at least a processor and a transmitter. The second portion 200/300 can include the sensor and cellular modem. This second sensor 200/300 can be mounted on a crash cushion directly or mounted in a location distant to the crash cushion, perhaps more protected, but in radio range of (for example, 300 meters) of device 100/300. Both devices are capable of monitoring "Ground Truth", that is, local conditions, location, and events. These devices are contained in separate enclosures protected from impact and weather. Device 200/300 may be located on a separate support member located a spaced distance away from the impactable object 380 so as not to be damaged or rendered inoperative by the impact. If a vehicle or other moving object impacts the impactable object 380, the sensor 100/300 transmits signal(s) by wired or wireless connection to the gateway 200/300 where the processor processes the signal(s) and the transmitter transmits information via cellular or fiber optic cable to the desired remote locations. An alternative device 340 may comprise a camera and similar circuitry to 100/300 to connect to the mesh network. If the device 340 includes the optional camera such camera may be located on or in either of the sensors 100/300 or 200/300 or may be located in a separate enclosure.

Alternatively, the sensors 100/300 may be mounted on a cable barrier at a distance such that the radio signal is received by one, or more than one, device. In this way many thousands of meters of cable barrier may be monitored at low cost using the mesh network to connect each of the devices to either another device which passes the signal along the network, or directly to the gateway, which passes the information directly to the cellular cloud and network.

In general, the power source may comprise a wired connection to a separate power source or a battery. Power sources may include "mains" power, solar, wind propeller, piezo crystal sound energy harvester, or battery. One particular type of battery that may be useable is a rechargeable 3.7-7.4 volt lithium ion, lithium iron phosphate, lithium iron phosphate, alkaline or other chemistry (type) battery.

In general, the device 100/300 may comprise any device or sensor capable of sensing or measuring data that relates to an impact or other vehicle parameter such as speed, count, location (GNSS, GPS, radio RSSI, radar, LIDAR, ultrasound), traffic queue, etc. For example, the device 100 may comprise a motion sensing device such as an accelerometer, tilt sensor, reflected light source, sound sensor, electrical, ultrasonic, laser, LIDAR, GNSS, GPS, or magnetic proximity sensor which is able to detect movement in any axis. One example of an accelerometer that may be used for this purpose is commercially available as ST Micro LIS2DH12. In some embodiments, the device 100/300 and/or processor may be configured to quantify the magnitude of an impact event or to distinguish between impact events of differing magnitudes (e.g., potentially ranging from minor vibration to major impact). For example, in some embodiments, the device 100/300 may comprise an accelerometer that is configured to measure or quantitatively determine the severity of an impact, thereby enabling the device 100/300 to distinguish between a major potentially injurious impact event and a minor impact event that would be unlikely to give rise to a need for immediate medical attention. When the impact occurs, the device 100/300 and/or its processor will determine whether the impact event was above or below a predefined threshold. This threshold would determine whether the impact was severe or minor. Alternatively, an impact exceeding an adjustable threshold could trigger the processor to begin sampling acceleration at 10-millisecond intervals, for example. These data once transmitted via a mesh network to a cellular "gateway" (200/300 in FIGS. 1, 2, 3, 4, 7) connection could be post-processed and through integration of the acceleration curve determine velocity of the initial impact and distance that the sensor, and consequently whether the barrier, has moved.

Optionally, the devices 100/300 may incorporate radiofrequency or other communication systems and may be equipped to be controlled and to communicate and/or self-synchronize with one another using a flocking protocol, mesh network or any other circuitry, apparatus, function, format, sequence, flashing program or other operation disclosed in any of the following United States Patents: U.S. Pat. No. 8,564,456 entitled Sequenced vehicular traffic guiding system; U.S. Pat. No. 8,154,424 entitled Sequenced Vehicular Traffic Guiding System; U.S. Pat. No. 9,288,088 entitled Synchronizing the Behavior of Discrete Digital Devices; U.S. Pat. No. 9,847,037 entitled Sequenced Guiding Systems for Vehicles and Pedestrians; 9,835,319 entitled Sequential and Coordinated Flashing of Electronic Roadside Flares with Active Energy Conservation; U.S. Pat. No. 10,443,828 entitled Sequential and Coordinated Flashing of Electronic Roadside Flares with Active Energy Conservation; and U.S. Pat. No. 10,536,519 (co-pending application Ser. No. 15/018,506 issuing on Jan. 14, 2020) entitled Synchronizing the Behavior of Discrete Digital Devices, the entireties of which are hereby incorporated herein by reference.

One troubling aspect of monitoring for impact is the incidence of "false positive" notification, that is, indication and notification of an impact when one did not occur. This leads to inefficiency as crews must be dispatched to inspect an attenuator that has not been struck. Furthermore, false notifications will compromise the effectiveness of the system as personnel will become reluctant to act quickly to inspect and repair. To reduce the incidence of false reports, this invention uses redundancy in the form of magnitude and duration of acceleration data. To be considered a true impact, according to one aspect, the 10-millisecond sampling rate reveals acceleration (motion) exceeding a threshold and a duration of 500 milliseconds, for example. It is the area-under-the-curve of magnitude plotted with time that represents a true impact. The method is to mathematically integrate the acceleration profile over time. This two-variable approach provides flexibility and opportunity to "tune" two variables, duration of motion of the sensor and instantaneous maximum of acceleration to best characterize impact events thereby reducing the incidence of false reports. Alternatively, using the mesh network and low-cost sensors without cellular modem or connectivity to the cloud network, multiple sensors can be placed on the same crash cushion. If two sensors report an impact, then it is less likely to represent a false report. This approach would be cost prohibitive if each sensor utilized a cellular modem for cloud connectivity.

The sensor may include microwave transmission, ultrasonic sounding, time-of-flight ranging for determining vehicle speed, GNSS, GPS location circuitry, count, and class of vehicle, that is, whether truck, motorcycle, or car. The sensor may comprise a "chip" antenna placed on the circuit board directly or incorporate an external antenna for a longer radio range.

In general, the processor may comprise a microprocessor which receives signals from the device 100/300 and is programmed to at least cause the transmitter to transmit or not transmit information in response to the signals received from the device 100/300. One example of a microprocessor that may be used for this purpose is commercially available as Texas Instruments CC2530F256.

In general, the optional camera 340 may comprise a video or sequential camera. One example of a camera that may be used for this purpose is commercially available as Selea Camera, Viadana, Italy.

Cost Benefit of Mesh Technology

In general, the transmitter may comprise a radio frequency, fiber optic, or cellular transmitting device capable of transmitting data from the device 100/300 to one or more remote devices or locations. Alternatively, where a plurality of devices 100/300 are in use, the transmitter of each device 100/300 may transmit signals to one or more neighboring devices 100/300 and finally to a transmitter such as a cellular modem or fiber optic connection (referred to herein as a gateway 200/300) which services the entire group. The gateway transmitter 200/300 will then transmit via cellular connectivity or fiber optic cable the desired data to the cloud network and on to one or more remote locations. In this manner, a plurality of devices 100/300 could be positioned to sense impact events involving a plurality of objects or at a plurality of locations on a single object. Utilizing a plurality of devices 100/300 linked to a single secondary cellular transmitter (gateway 200/300) via a mesh network or flocking protocol of this type can provides a lower-cost system by which a plurality or even a multiplicity (e.g., hundreds) of individual devices 100/300 may connect and transmit data to the desired remote locations via a single cellular account so long as each of the devices 100/300 is within signal transmission range of at least one of the other devices 100/300 and at least one of the devices 100/300 is in range of the gateway 200/300

The cost of a cellular modem is substantially greater than the cost of local area network (1000 meters) 900 MHz-2.4 GHz transceiver. In addition, the cellular connectivity incurs monthly fees, requires larger batteries and solar panels, and may be larger and weigh more. Hence, using low-cost sensors connected via a mesh topology, each with low-cost batteries and circuity allows for expansion of the number of road assets to be monitored. This multitude of sensors will connect to the cloud server and Internet via a single, or multiple, gateways. The gateway, itself a sensor identical to the other devices, includes the cellular modem or fiber optic connector. State Departments of Transportation are cost conscious and availability of a low-cost sensor will lead to safer, more wide-spread deployment.

Examples of the mesh network and flocking protocol are described herein.

Mesh Network Operation

Sensors placed on roadways are dangerous to deploy and maintain. Maintenance crews are exposed to high-speed traffic each time they must service a device. Accordingly, battery life or solar operation should insure long-life, and the electronics should be trouble free. Updating of firmware should be remotely performed. To achieve low power for many years, a mesh protocol is incorporated that provides battery life equivalent to the shelf-life of the battery. Solar power is an option although cost and complexity increases. Low power is achieved through low duty cycle. The device is in a quiescent "sleep" mode for 99% or greater percentage of the time. Yet, each device becomes connected to the network such that when an impact occurs the device can awake in microseconds, send its message, and be assured that another device is awake to receive the message. In many deployments, availability of a low-cost external timing signal, such as W W V, GPS GNSS timing signal, etc., is absent. The novel advantage of utilizing a mesh network is that no external timing signal is required or used. Each device, via firmware innovation, awakes and resynchronizes with the network during an approximately 1-5 millisecond period during an approximately one second interval. Alternatively, node/gateway synchronization could occur every 15 seconds thereby further reducing power consumption. This latter 15-second time period would be achieved with the addition of a low-cost 32.768 KHz watch crystal that provides a quite stable, low-drift timing signal while the processor is in quiescent sleep mode. While in quiescent sleep mode, a "Watch Dog Timer" maintains the internal clock rate using nano-amperes of power. In other aspects, other periods and intervals can be used. As each device awakes at a random time within an established time window, no two devices are transmitting at the same time, yet many devices are "listening" throughout the communication time window. In this way, an interrupt-generated signal indicating an impact can be transmitted by a device with assurance that another device will receive the message, yet each device is only consuming power for a fraction of a second and is otherwise "asleep" in quiescent mode consuming minimal power. Acknowledgement of the receipt of the message is also sent across the network for the devices (nodes) to receive. This novel aspect of mesh technology allows for impact (interrupt)-driven communication between members of the mesh network and requires miniscule energy. In addition, these components are inexpensive. The system wherein many low-cost local area network sensing nodes are able to monitor a large number of critical road safety assets and deliver notification in real-time via a single, more expensive modem and cellular or fiber connection is described below.

One-to-Many

Using radio communication, devices 100/300 equipped with radio receivers may be monitored or controlled remotely using any suitable type of remote control apparatus including but not limited to a mobile phone, tablet computer or other computing device that is programmed to control the devices 100/300 and or a dedicated remote control as a hand held remote controller, a remote controller that is mounted on or in a case, a remote controller that is positioned in an emergency vehicle, etc. The use of a software application on a mobile phone, tablet, etc. provides a method for updates including modifications and/or new features to be pushed to the operator over a cellular network. In some embodiments, firmware improvements can be applied to the devices 100 and 200 using the mobile phone or desktop PC.

In some instances, the remote-control apparatus and software can be incorporated directly into the state DOT traffic management system. This would provide an available remote-control system able to operate various operational parameters of the devices 100/300 or 200/300 from a distance of 300 meters or greater if controlled locally by a dedicated control device. Rather than placing a cellular module in each device 100/300, a single cellular communication device can be placed in device 200/300 and this would then communicate with an unlimited number of devices 100/200 via a mesh network from a location limited only by Internet availability. This would preclude the need for a dedicated hardware device for local control (300 meters, for example), as one's mobile phone connected to the Internet could control the entire sensor network and receive alerts from the network. The network, despite employing hundreds of sensors, would use but a single cellular modem.

Failure to Check-In Notification

Should a device 100/300, upon impact, be destroyed, the absence of a transmission by this device will quickly be noted by other devices in proximity, and this missing signal, along with the identifier, location, and timestamp, will be passed along the network to the gateway 200/300 and to the cloud network for post processing. This absence, once confirmed over several transmission periods, will result in an alert and subsequent notification to personnel for inspection.

In some embodiments, the sensor(s) and processor(s) may be configured to cause the transmitter(s) to transmit not only data relating to an impact event (e.g., severity or magnitude of impact, time of impact, etc.) but also data relating to the device itself, such as device battery status, temperature, impact history, which may be transmitted to a remote location, such as a department of transportation facility or contractor responsible for the device 100/300, via smart phone or PC dashboard software applications or other suitable means. In addition, the microcontroller and embedded control software allows for "tuning" of the accelerometer sensitivity from a remote location via PC or smart phone. By adjusting the accelerometer sensitivity and time-duration threshold, the operator can minimize false trigger resulting from bridge vibration or truck wind wake, for example. This tuning can take place from a distance and be applied to any one of many sensors via access through a single cellular connection on the roadway. Each sensor can have a unique "address" on the local roadway network. In this way, the network communication is bi-directional, both from the node sensor to the network on to the cellular cloud, and from the controller's desktop, to the cellular network, to the gateway and finally to one or multiple nodes for firmware upgrade, tuning of sensitivity, or other function.

Optional Multiple Sensors to Deter False Triggering or False Negative:

In some embodiments of the device 100/300, multiple sensors may be applied to a long attenuator. Artificial Intelligence (AI) software or standard algorithms can compare the vibration data sent from each unit to establish with greater certainty whether vibration is related to normal road activity (e.g., truck passing by, high wind, earthquake) or whether the vibration represents actual impact. As the attenuators may be many meters in length, it is possible that a vehicle might strike one section while not creating impact acceleration in another. Multiple sensors will allow for both redundancy and greater sensing coverage. One novel aspect of this invention includes the advantageous ability to use exceptionally low cost, long battery life sensors passing data along a mesh network to a single cellular or fiber optic connection point. For example, five (5) low-cost sensors 100/300 can be placed in multiple locations along the crash cushion and pass their data to a single cellular modem. As vibration data is sent to the central server, AI software or other standard algorithms can determine whether the pattern represents a real event versus background noise. In addition, the time duration of motion can be adjusted as a decision factor to confirm true impact. Sensors are part of a local mesh or other radio network.

Referring to FIG. 2, one or more gateways 200/300 having cellular connectivity can receive signals from one or more sensors of a network of devices 100/300 and other devices sharing the network. The gateway 200/300 may be enclosed within an impact sensor, such as a barricade-style warning lamp 250 shown in FIG. 2, speed sensor, traffic cone, barrel, or another delineator, or mounted on a mounting device on the roadway. The node 100/300, in a similar fashion, may be attached via adhesive tape to any asset on the highway.

The sensor 100/300 noted in FIG. 2 can be part of a local mesh or other type of radio network that will allow for the device 100/300 to transmit its health status, such as battery level, operating condition, impact history, temperature, other parameter, or impact event to other devices of the network that are within range. One of these other devices may be connected to the cellular or fiber optic network and then to the Cloud and Internet for display on a PC dashboard or mobile smart phone. Other devices positioned on the roadway, for example a lamp 250 shown in FIG. 2 or speed monitor, when operating within the same network and incorporating the same components on its circuit board as are found on circuit board 100, can join the network, pass its data via the network to other nodes 100/300, and request to have its health status or data collection to be transmitted by the gateway device 200/300 to the cloud as well. In another aspect, the device 100/300 may use the gateway 200/300 to transmit its data to the Cloud. In this way, many sensors, or devices on the highway, whether lamps or speed sensors or accelerometers or lamp photodetectors (monitoring flashing lamps status) can share and participate on the network for the purpose of transmitting their health status and event status via a single cellular modem. Control information may be sent to the lamp or sensor as well, turning the device on or off, adjusting brightness of the lamp or sensitivity of the motion sensor or range of a vehicle counting device. These devices need not be in range of the cellular gateway 200/300. They communicate by being in range of another device, either sensor 100/300 or gateway 200/300, in the network. One deployment might include a plurality of flashing lamps equipped with accelerometers that not only provide visual guidance but will report an impact as well. These lamps, as part of the local mesh network, can transmit their status, including an impact event, to the cellular gateway for distribution as an alert to appropriate personnel.

Figure 3:
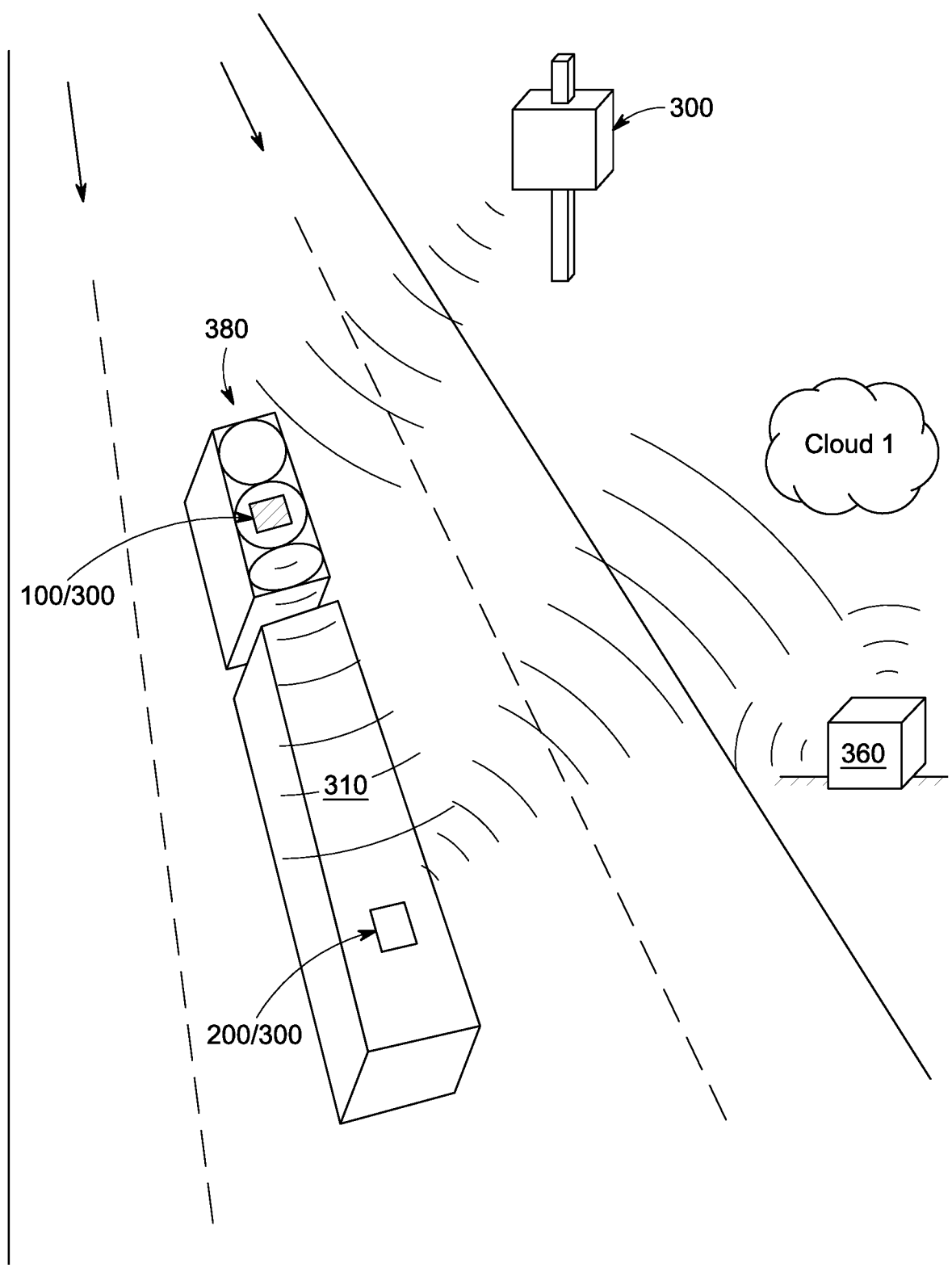
FIG. 3 illustrates an example of an aerial view of a crash cushion monitored by a node with enclosure 300 and circuit board 100 (100/300) and gateway (circuit board 200) within enclosure 300 (200/300). A camera can be included in the mesh network.

FIG. 3 is an example of how a crash cushion 380 is situated in the roadway and deployment of a node sensor, camera and gateway. A concrete barrier 310 is used to delineate road separation. To protect vehicles and drivers from impact with the end of the concrete barrier, a crash cushion 380 is employed. Node 100/300 comprises an accelerometer and radio communication component to transmit events to, and receive instructions from, Cloud 1. Should the crash cushion 380 be impacted, node 100/300 will detect the movement and transmit an alert to gateway 200/300. Gateway 200/300 periodically connects with Cloud 1 for routine health status checks of the system but will immediately connect to Cloud 1 upon an interrupt signal from any node 100/300. Camera 340 is also a member of the mesh network that includes node 100/300 and gateway 200/300. Should node 100/300 register an impact and transmit an alert, camera 340 will save and transmit still photographs captured each 200 milliseconds during the past 3 seconds. These photographs, along with acceleration data captured by node 100/300, will be transmitted to gateway 200/300 that will forward these data to Cloud 1 via cellular or fiber optic connectivity. Cloud 1 then forwards alerts via the Internet to appropriate personnel at the maintenance facility as well as to county or state traffic management systems and to appropriate law enforcement. The state may have installed fiber optic infrastructure allowing for low-cost, high-speed communication to the state DOT traffic management system. Gateway 200/300 may be located in junction box 360 and rather than requiring cellular connectivity to Cloud 1 to transmit alerts, health status, and to receive commands, can do so via optical fiber without monthly cost.

Figure 4:
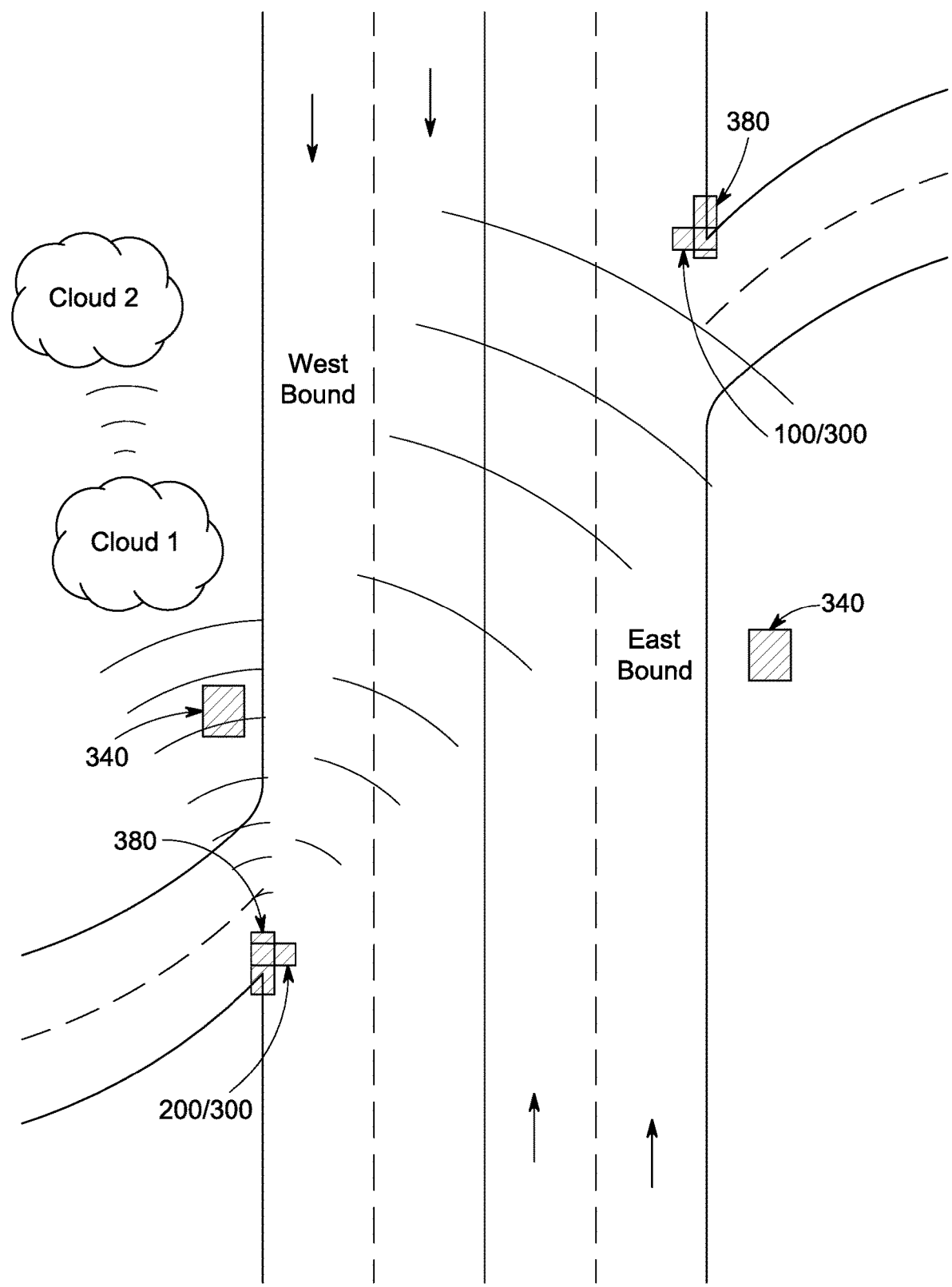
FIG. 4 is a schematic description of several crash cushions being monitored by a single gateway, according to certain embodiments.

FIG. 4 illustrates multiple sensors connecting to the Cloud server via a single gateway. The exits of the westbound and eastbound traffic are each protected by a crash cushion 380. The eastbound crash cushion 380 is equipped with a node sensor 100/300 while the westbound cushion 380 is equipped with gateway 200/300. Both devices, 100/300 and 200/300 comprise the same or similar sensors and can detect impact. Device 200/300 further comprises a cellular modem and utilizes cellular connectivity or fiber optic connection. Upon impact of eastbound cushion 380, sensor node 100/300 will detect impact and send an alert to gateway 200/300 located on the westbound exit. Gateway 200/300 will immediately connect to Cloud 1 and send an alert to appropriate personnel. Cameras 340 could be included in the network. Upon receiving impact notification at Cloud 1 server, the alert will be transferred to other agencies such as the DoT utilizing Cloud 2.

Figure 5:
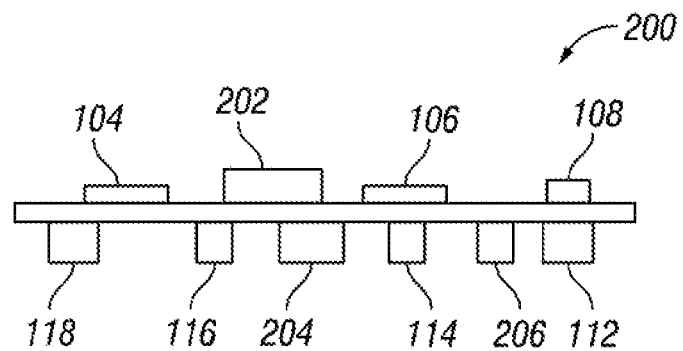
FIG. 5 is a diagram of an example gateway type of circuit board useable in the various devices, including the devices of FIGS. 1-4.

FIG. 5 illustrates an example of a gateway type of circuit board. Components mounted on the node circuit board 100 (not shown) and gateway 200 (shown FIG. 5) may include one or more of: a GPS antenna 104 (GGBLA.125.A, Taoglas USA, San Diego, Calif.), GPS CNSS receiver 106 (GGBLA.125.A, Taoglas USA, San Diego, Calif.), MCU transceiver 108 (CC2530F256RHAR, Texas Instruments, Dallas, Tex.), accelerometer 118 (LIS2DH12TR, ST Micro, Geneva, Switzerland), voltage regulator 112 (UM1460S-33, Union Semiconductor, Hong Kong, China), LED driver 114 (BCR421, Diodes Incorporated, Plano, Tex.), and temperature/humidity sensor 116 (HTS221TR, ST Micro, Geneva, Switzerland). A vent with weather protection filter may be formed through the wall of the cavity, to permit circulation of ambient air into the cavity so that any temperature/humidity sensor 116 can accurately sense temperature and/or humidity in the area of the device 100/300. The listed components, when present, may perform at least the following functions:

GPS antenna 104 and GPS CNSS receiver 106 enable a node or gateway device to send and receive Ground Truth data and/or other information by GPS. Examples of the types of information that may be received and/or transmitted using the GPS antenna 202 GPS CNSS receiver include the precise location of the device (e.g., longitude/latitude) as well as precise timing. Incorporated in the satellite-based GPS GNSS signal is precise timing information, which can be used to synchronize the mesh network radio transmission/receiving timing using less power than low duty cycle synchronization. Absent the precise GPS GNSS timing information, the nodes in the mesh network must "awaken" periodically, for example, at approximately 100 millisecond intervals, to connect with other nodes to reset their clocks. Otherwise, internal MCU clocks may drift. With the external clock reference available with GPS GNSS, the duty cycle used to resynchronize can be much lower. The nodes may awaken at approximately 30 second intervals, for example. In other aspects, the nodes may awaken at intervals other than approximately 30 seconds. Hence, GPS GNSS circuity provides not only location information but timing and mesh synchronization as well.

MCU transceiver 108 enables wireless radiofrequency transmission to and from a node or gateway device in which it is positioned. Examples of the types of information that may be received and/or transmitted using the MCU transceiver 108 include information for sequencing or controlling operation of networked devices as described in the various United States Patents and published United States Patent Applications referred to above and expressly incorporated herein by reference, as well as sending information relating to the status and/or functioning of individual networked node devices to or from a gateway device which, in turn, may send/receive information (e.g., GPS GNSS location, accelerometer-sensed movement and orientation relative to gravity, sensed temperature, sensed humidity, LED operating mode/pattern/status, software firmware updates, or other communication to one or more remote locations (e.g., control centers) via telephonic, fiber optic cable (when available), Internet, cloud-based, cellular, direct to vehicle, or other means, etc.

accelerometer 118 senses movement of any device in which it is positioned and enables movement-related information (such as notification that the device has been impacted by a vehicle, tipped over by wind, or otherwise moved from its intended position or location;

voltage regulator 112 provided voltage regulation;

LED driver 114 drives and controls

Temperature and humidity sensor 116 senses ambient temperature and humidity;

Circuit Board 200 is identical to circuit 100 except 200 includes the cellular modem and associated components described below.

Components mounted on the gateway circuit board 200 (FIG. 5) may include one or more of the components shown on the node circuit board 100 and, in addition, one or more of the following additional components: cellular antenna 202 (FXUB63070150C, Taoglas, San Diego, Calif.), cellular modem 204 (B402, Particle, San Francisco, Calif.), and solar harvester/charging circuit 206 (SVT1040, ST Micro, Geneva, Switzerland or BQ25505, Texas Instruments, Dallas, Tex.). These additional components, when present, may perform at least one or more of the following functions:

The cellular antenna 202 and cellular modem 204 enable cellular communication to and from a gateway device in which the gateway circuit board 200 is present. Examples of the types of information that may be received and/or transmitted using the cellular antenna 202 and cellular modem 204 include sending/receiving information via cellular or other communication to one or more remote locations (e.g., control centers) via telephonic, internet, cloud-based or other means, etc. Where available, and now commonly provided by infrastructure providers such as state Departments of Transportation, are fiber-optic communication networks. These are placed in junction boxes along highways, and where in range of a work zone the gateway 200 circuit board could be equipped to plug directly into the fiber optic cable system to avoid cellular modem hardware cost and recurring monthly connection and server fees. Nodes 300/100 will continue to communicate with gateway 300/200. However, in deployments where fiber optic communication is available, gateway 300/200 will not use cellular, but rather the fiber optic network to connect to Cloud 1.

The solar harvester/charging circuit 206 provides integrated energy management by extracting power from any properly connected solar panel (305 described below) and using such energy to charge one or more batteries.

Figure 6:
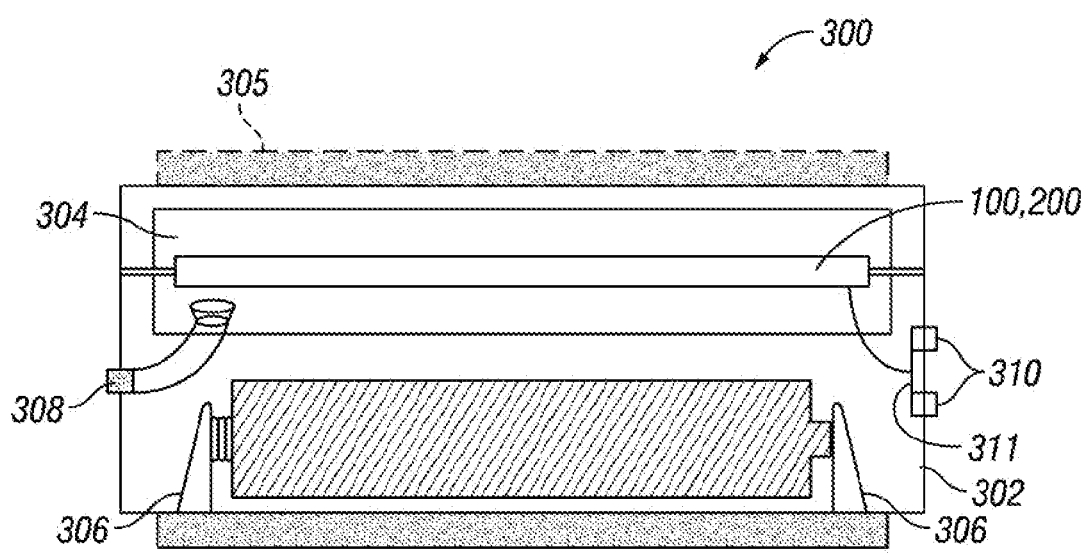
FIG. 6 is a side sectional view of an example housing device which may incorporate a gateway type of circuit board, an example of which is shown in FIG. 5.

FIG. 6 shows one non-limiting example of a housing device 300 within which either the node circuit board 100 or gateway circuit board 200 may be mounted. This housing 300 may then be attached to or positioned on any suitable type of traffic channelizing device (e.g., cone, delineator, barrel, fencing, flare, warning light, sign, electronic roadside display, etc.) or any other object (vehicle, construction equipment, roadway debris, etc.). In the example shown, this housing 300 comprises an enclosure having an inner cavity 304 within which the circuit board 100 or 200 is mounted. Battery contacts 306 are provided such that a battery B may be mounted within the housing device 300 to power the device. In embodiments where the circuit board 100 or 200 includes a solar harvester and charging circuit 206, the housing device 300 may also include a solar panel 305 and associated circuitry to collect and use solar energy to power the device and/or change the battery B. In embodiments where the circuit board 100 or 200 includes temperature and/or humidity sensor(s) 116 a vent 308, which may include a weather protection filter and/or associated duct(s) may be provided to permit circulation of ambient air into the cavity 304 so that any temperature sensor 116 may accurately sense temperature and/or humidity in the area of the housing device 300.

Figure 7:
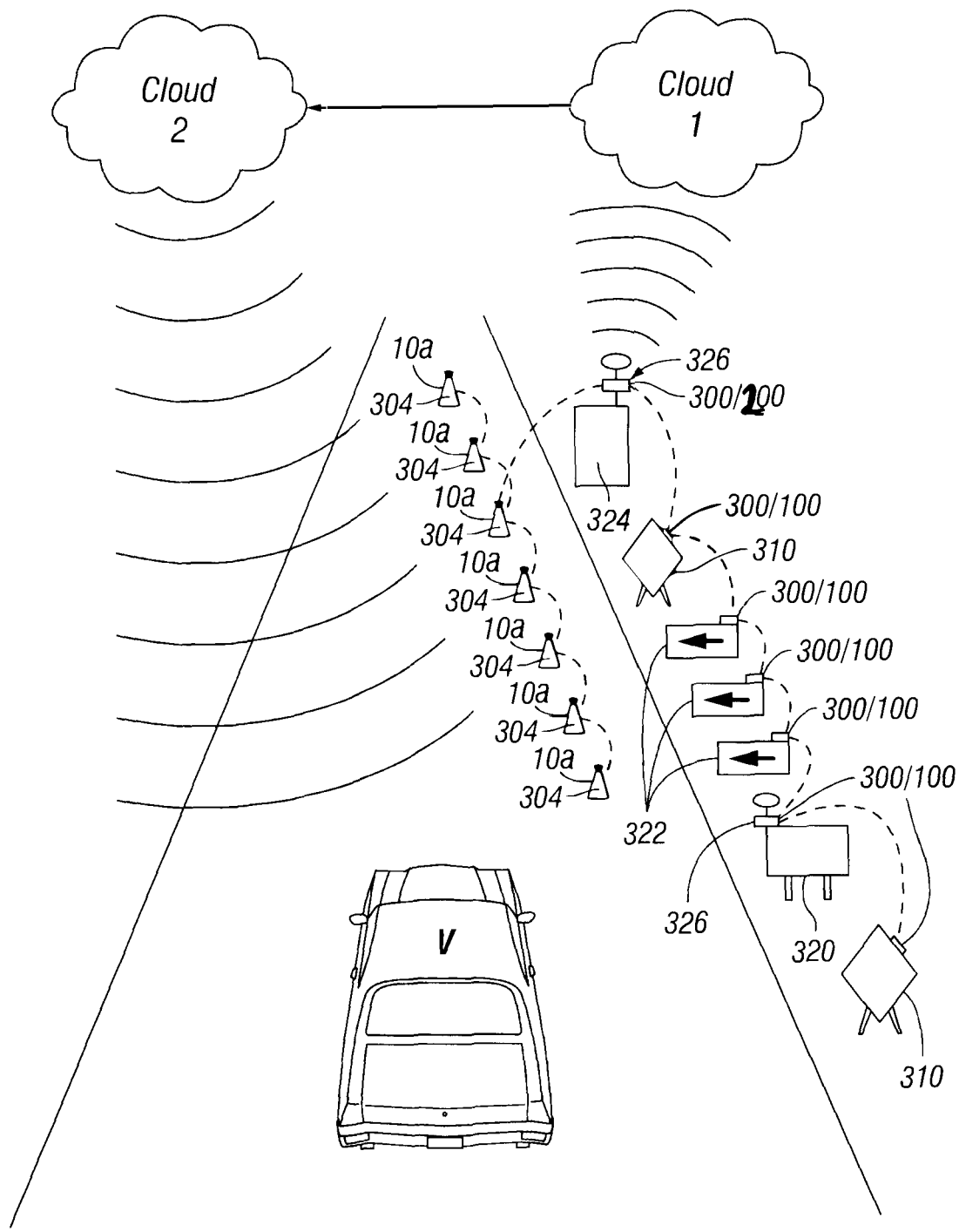
FIG. 7 is a diagram showing one non-limiting example of a safe highway work zone and impact sensor system and method of reporting for using a number of devices of the present disclosure.

FIG. 7 shows one non-limiting example of a smart highway work zone with multiple impact cushions and other objects on the roadway. The impact sensor described in this disclosure can be mounted on any asset located on the highway that must be monitored. This includes signs, barrels, crash cushions, traffic cones, etc. As shown, these cones, barrels, or other objects such as signs, are positioned in a row on a roadway surface to delineate a narrowing area of travel, such as a partial lane closure. Each of the cone-mounted devices 10a is equipped with a node circuit board 100 but may be in an alternative enclosure (not 300). This smart work zone network also includes a number of additional items positioned along one side of the roadway, as follows:

A plurality of diamond shaped portable warning signs 310 having housings 300 attached thereto, each such housing being equipped with a node circuit board 100 as described above;

A rectangular post-mounted sign 320 which has a flashing warning light 326 mounted thereon with an attached housing 300 equipped with the node circuit board 100 as described above;

A series of electronic displays 322 programmed to show illuminated arrows directing traffic to move to the left, with attached housings 300 equipped with the node circuit board 100 as described above; and A reflective traffic barrel 324 having a flashing warning light 326 mounted thereon with a housing 300 equipped with the gateway circuit board 200 attached thereto.

In the example of FIG. 7, if any of these objects are struck, the alert signal will be transmitted along the mesh network ultimately arriving at a gateway. The latency, or time delay, is measured in milliseconds. Upon receiving the alert, the gateway 200/300 will connect to Cloud 1 to notify appropriate personnel. As each device has GPS GNSS location and time stamp, personnel will know where the device is located and when it was struck.

FIG. 7 illustrates that multiple low-cost sensors can provide near-real-time notification of a roadway vehicle-object impact at low cost by using a single cellular or fiber optic connection. This invention is not limited to stationary crash cushions but can be used on temporary traffic control devices as well. Should any of the delineators (traffic cones, barrels, barricades, for example) equipped with a sensor node (designated by 300/100) be impacted, the alert will be transmitted and pass along the network until the message is received by the gateway 300/200.

Also, control signals may be sent via Cloud 1 to the gateway device 300/200 mounted on barrel 324 which, in turn, may transmit such control signals via radiofrequency transmission to all of the node devices in the network. In this manner, a control center may remotely transmit to the node devices any desired setting changes (e.g., changes in LED flashing frequency, pattern, sequence or color), software/firmware updates, etc. FIGS. 8 through 16 illustrate the electronic circuity designed to monitor and control remoted devices.

Figure 8:
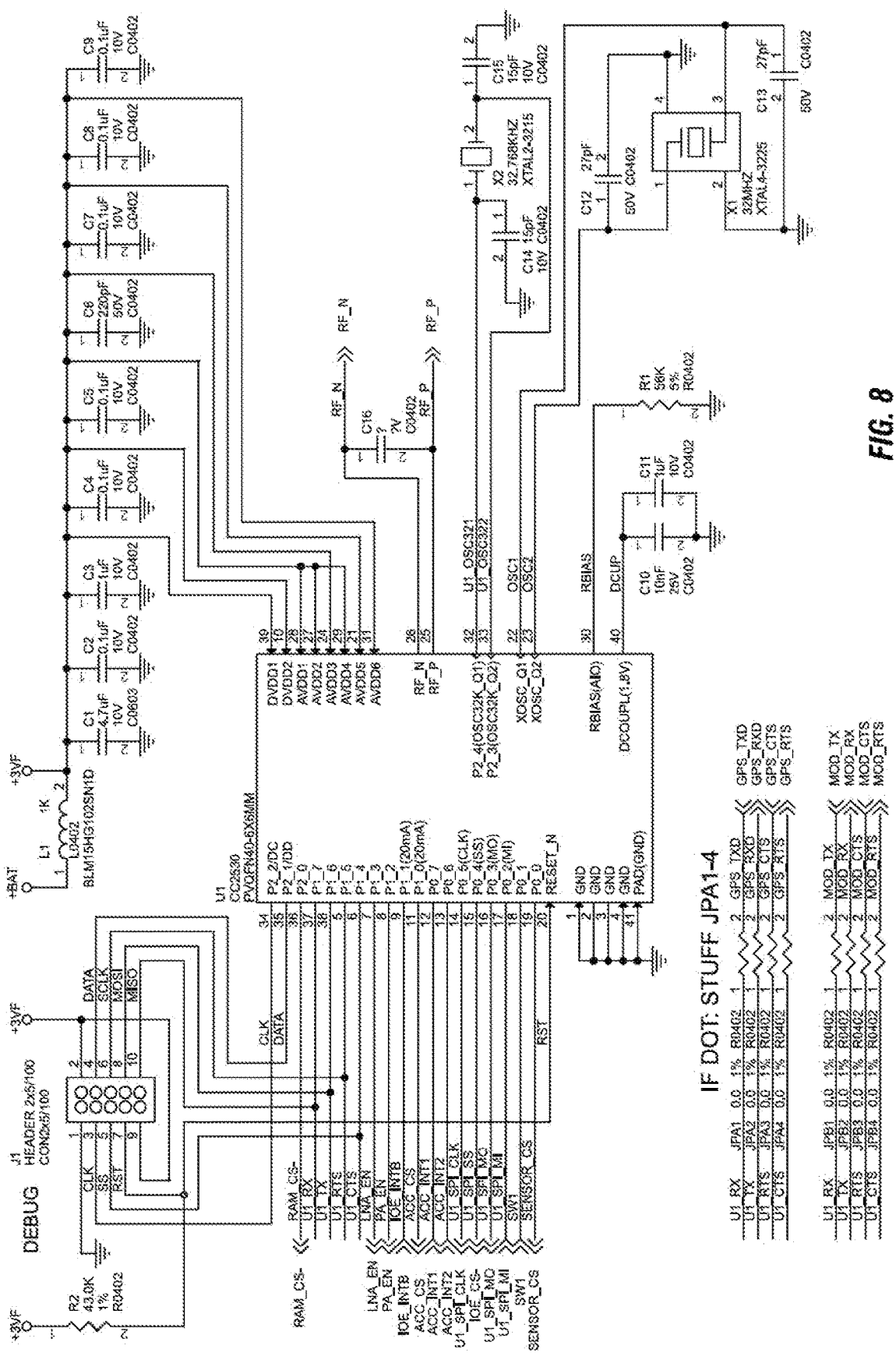
FIG. 8 is an electrical diagram of an example radiofrequency engine component useable in devices of the present disclosure.

FIG. 8, referred to as the "RF Engine" describes the Texas Instrument CC2530 microcontroller (U1) and 2.4 GHz radio transceiver in a single System on a Chip (SoC). This device incorporates and 8051-series microcontroller. The MCU is programmed via the J1 header using a 10-pin connector. Two crystals are utilized; X1 is a 32-megahertz crystal for timing radio communication while X2 32.768-kilohertz controls the Watch Dog Time when the device is in low-power sleep mode.

Figure 9:
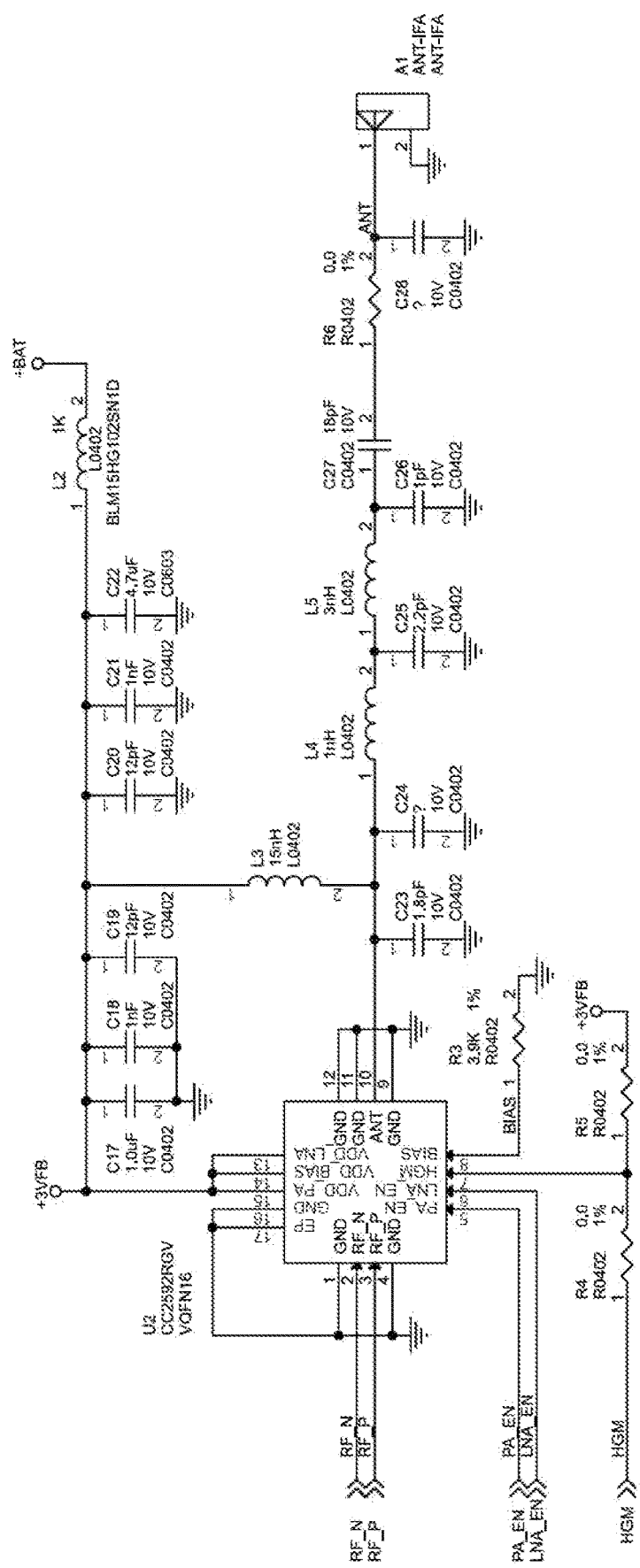
FIG. 9 is an electrical diagram of an example radiofrequency extender component useable in devices of the present disclosure.

FIG. 9 illustrates the design of the radio frequency range extender (U2). The CC2530 MCU described in FIG. 8 can drive an inverted-F trace antenna directly. However, for greater radio range, the addition of the CC2592 (Texas Instrument) range extender amplifies the radio frequency output signal of the CC2530. It uses the Pi network illustrated by the capacitors and inductors on the ANT output, and drives the trace inverted-F antenna at 50-ohm impedance resonant at 2.45 GHz.

Figure 10:
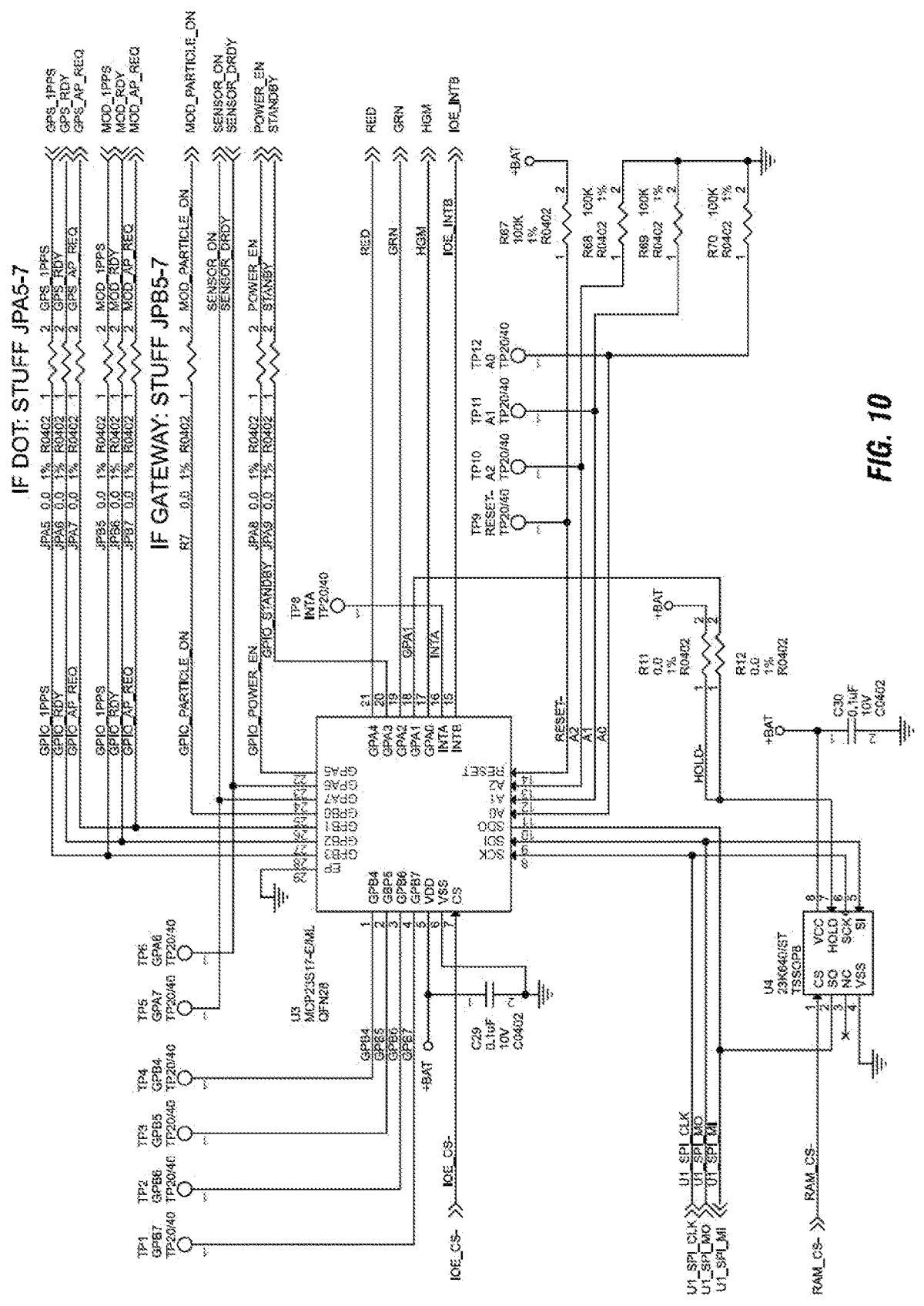

FIG. 10 defines the circuitry for U3 and U4. U3 an input-output expander (I/O expander) incorporated to provide more controls features. The CC2530 MCU SoC has limited inputs and outputs 21 inputs and outputs. With the addition of temperature sensing, GPS GNSS, accelerometer, cellular communication, etc., additional I/Os are used. This MCP23S17 (Microchip Corporation) provides 16 additional external controls. U4, part number 23K640 (Microchip Corporation) provides addition memory for collecting, transmitting, and storing data. This component, external RAM, also provides the memory to do Over the Air (OTA) updates to the CC2530 and the associated components. An SPI bus is used to communicate to components U3 and U4.

Figure 11:
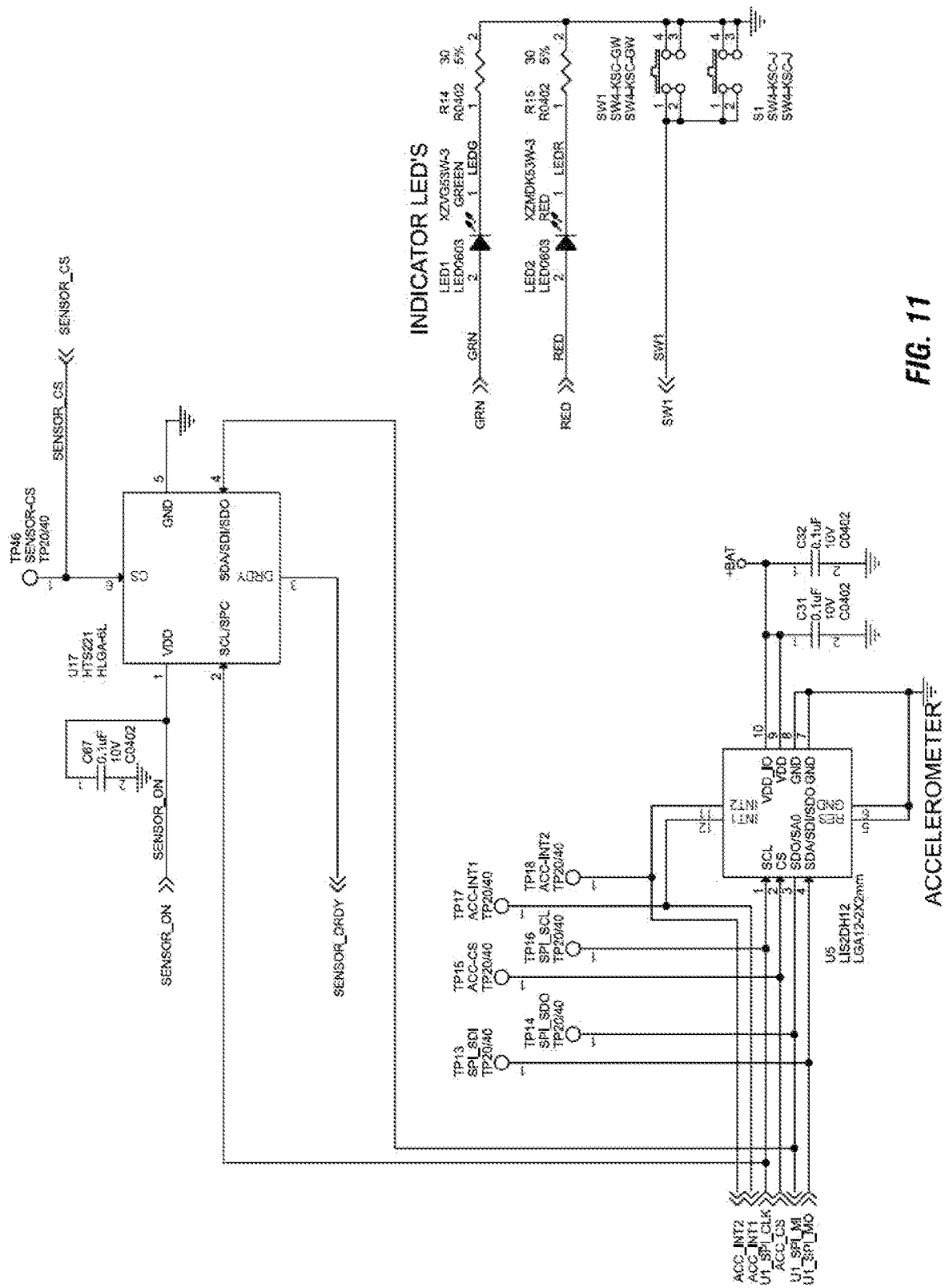
FIG. 11 is an electrical diagram of the accelerometer and temperature and humidity sensor used in devices of the present disclosure, according to certain embodiments.

Temperature, humidity, and acceleration (impact) are sensed utilizing components U17 and U5 shown in FIG. 11. These also communicate to the MCU U1 via an SPI communication bus. U17, sensing temperature and humidity (ST Microelectronic), uses a weather protected vent to the atmosphere outside the sealed enclosure. The accelerometer (LIS2DH12) U5 (ST Microelectronics) can be remotely adjusted to tune sensitivity. Low power indicator LEDs, LED1 and LED2, are used for validation and testing during production.

Figure 12:
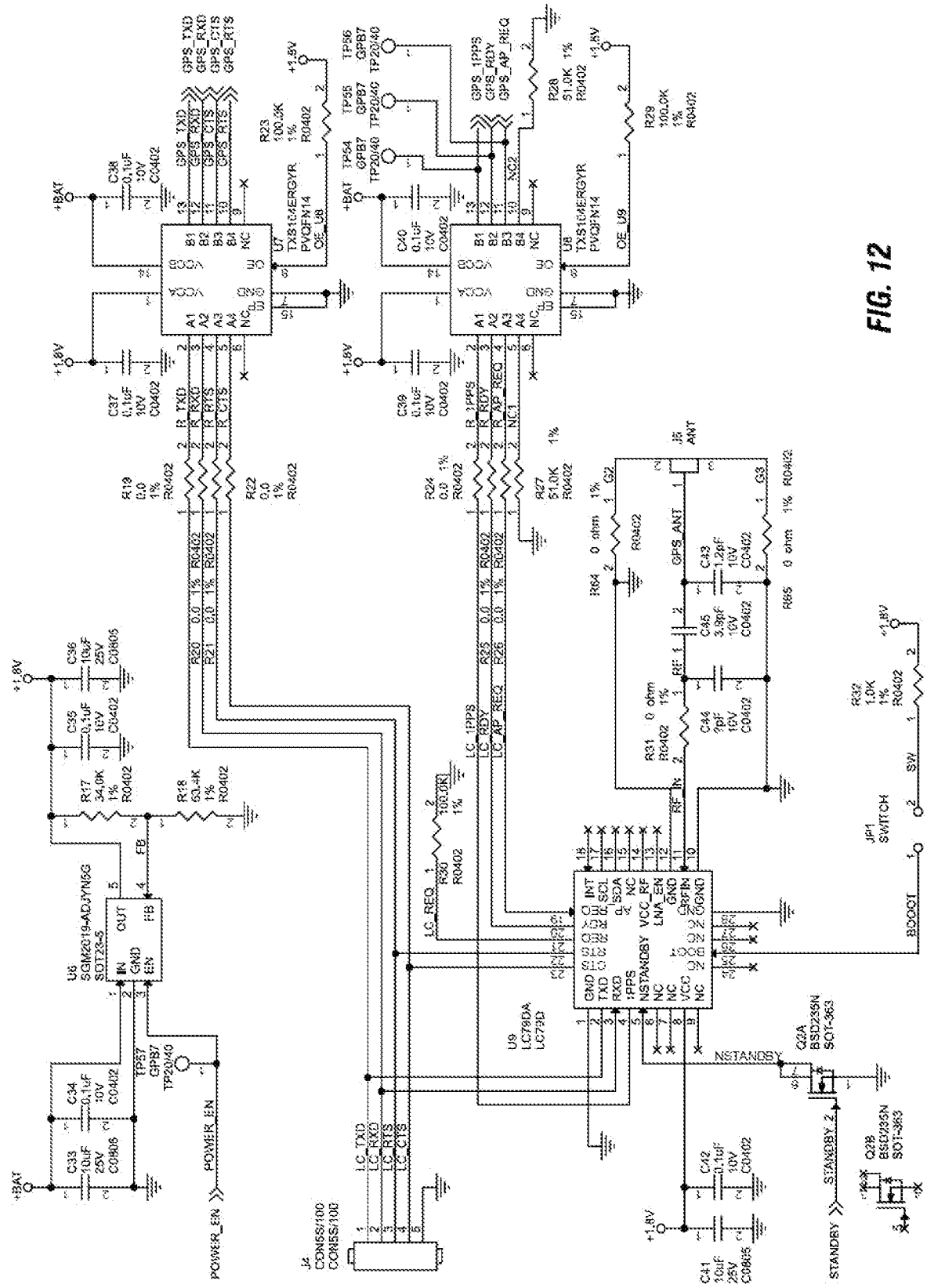
FIG. 12 is an electrical diagram of an example GPS GNSS component and its associated voltage regulator and translator used in the device of the present disclosure.
Figure 13:
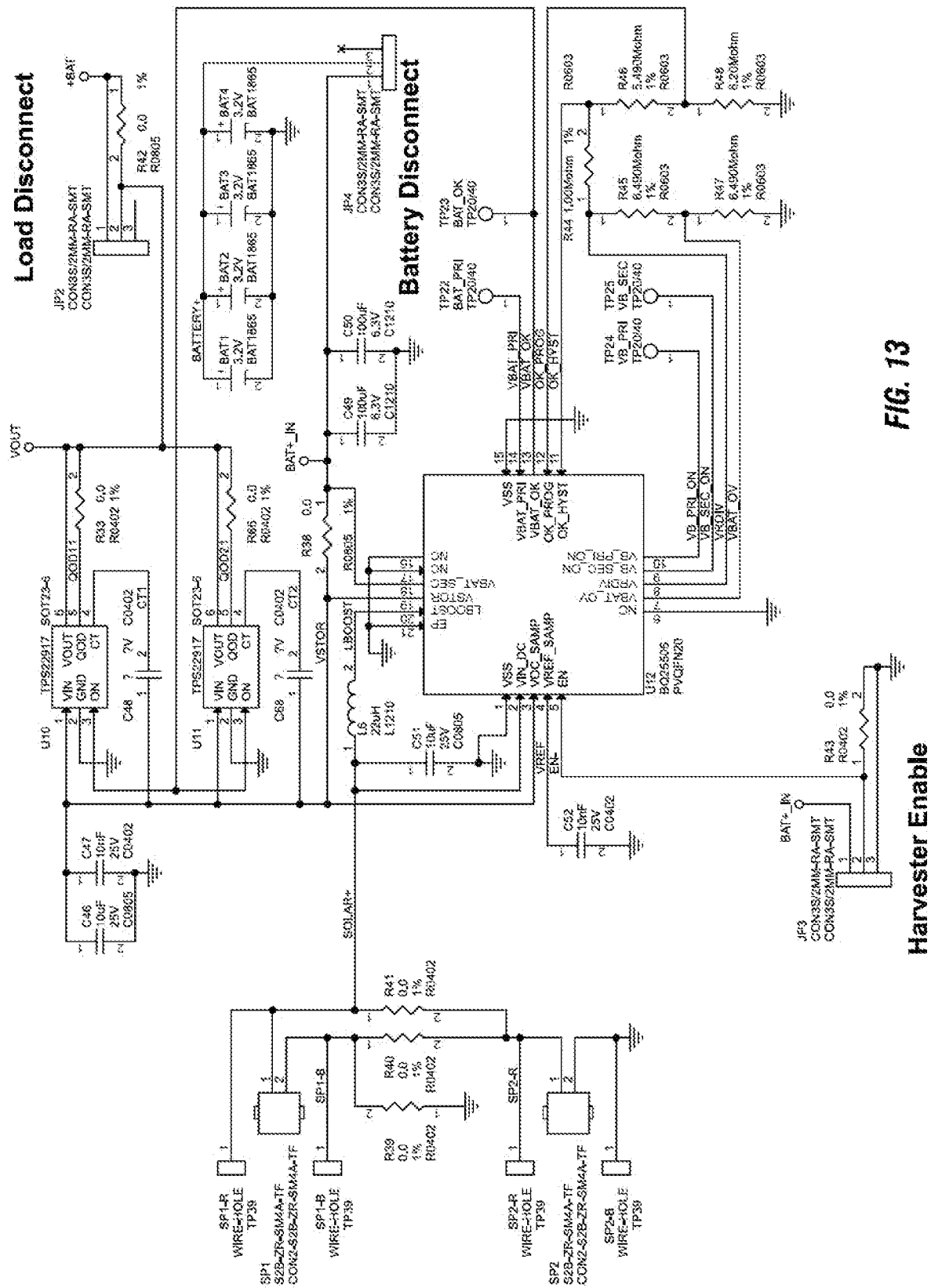
FIG. 13 is an electrical diagram of an example solar harvester component useable in devices of the present disclosure.

U9, the GPS GNSS system (LC79DA—Quectel) shown in FIG. 12, communicates via UART protocol. It uses a separate power regulator U6 (SGM2019) at 1.8 volts. As the MCU operates at 3.3 volts, level translation is used for I/Os and is accomplished with U7 and U8, Texas Instruments TXS104.

For those devices utilizing power charging of batteries, a solar harvester, BQ25505 U12 is utilized. This Texas Instrument component, illustrated in FIG. 13, converts low-power input from solar panels (photovoltaic panels SP1 and SP2-optional) and charges the lithium ion or lithium iron battery. U10 and U11 are switches that disconnect the load should the battery discharge and utilize several hours of sun to recharge. This allows for faster recharging without the load drawing power.

Figure 14:
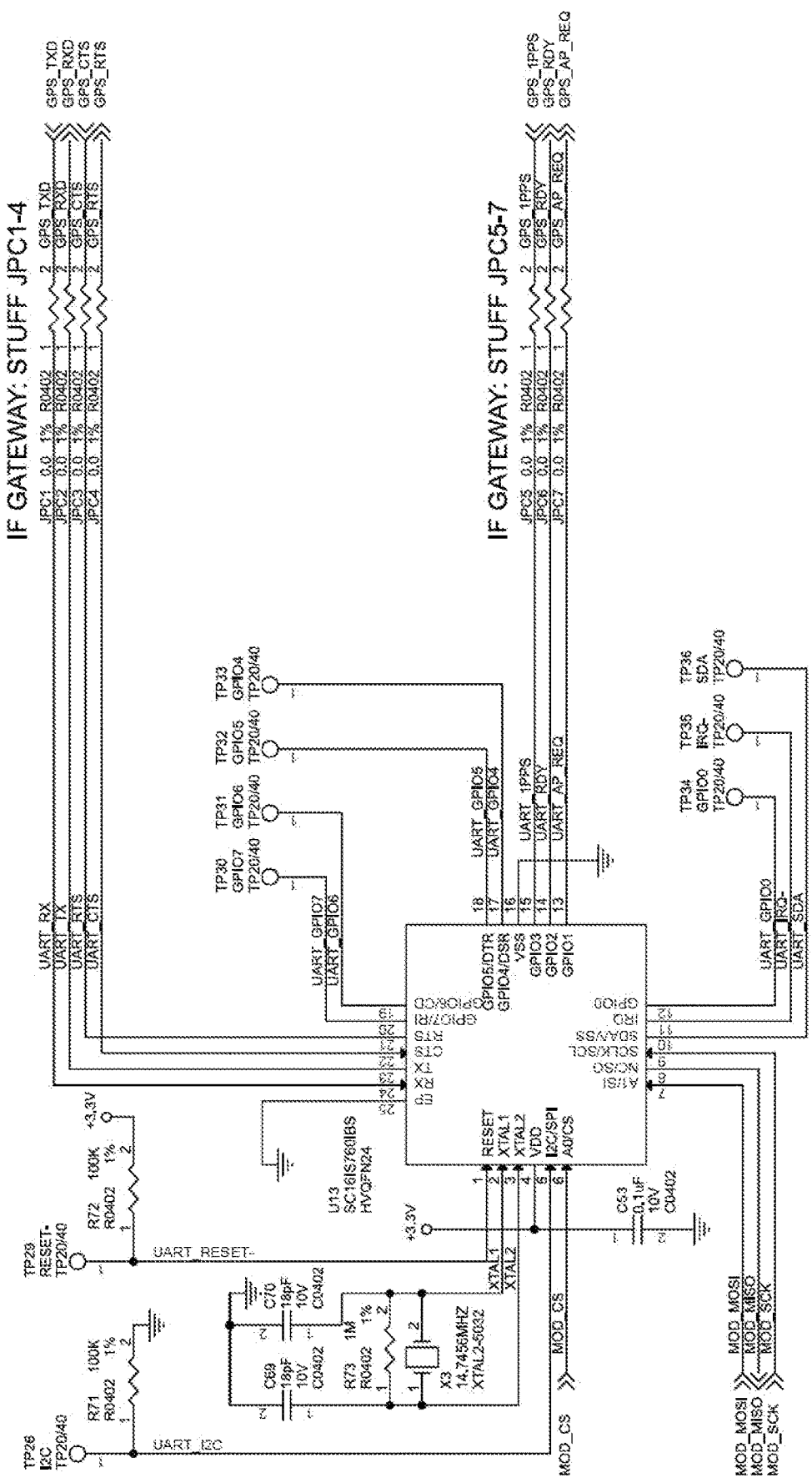
FIG. 14 is an electrical diagram of an example translator passing SPI formatted data to UART devices used in devices of the present disclosure.

FIG. 14: As the GPS GNSS and Particle modem communicate to the MCU using UART protocol, a serial translator (U13) translates SPI to UART. U13, SC16IS760IBS is manufactured by NXP Inc.

Figure 15:
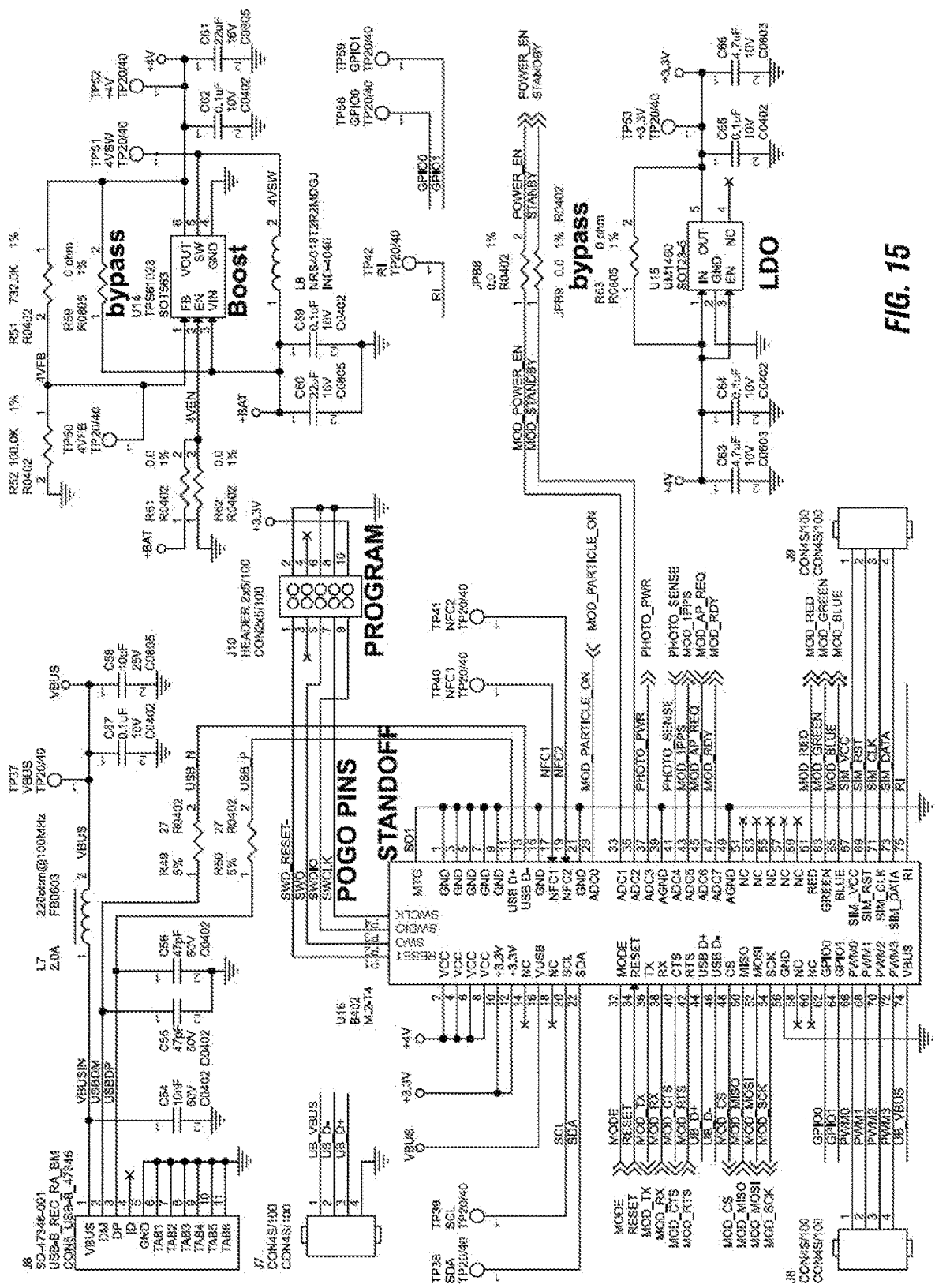
FIG. 15 comprises electrical diagrams of example connection, voltage regulator and switch controlling the cellular modem and other components used in devices of the present disclosure.

While communication in this mesh network is many-to-one, the one device connecting via cellular to the cloud utilizes a cellular modem, which is illustrated in FIG. 15. U16 is a plug-in header for the Particle modem. U14 (Texas Instrument TPS61023) is a boost voltage regulator to supply 4 volts to the Particle modem. This modem also uses 3.3 volts that is switchable (to turn off and lower power consumption when not in use). U15, a Union Semiconductor Low Drop Out regulator (LDO—UM1460) provides 3.3 volts to the Particle to control logic on the modem.

Figure 16:
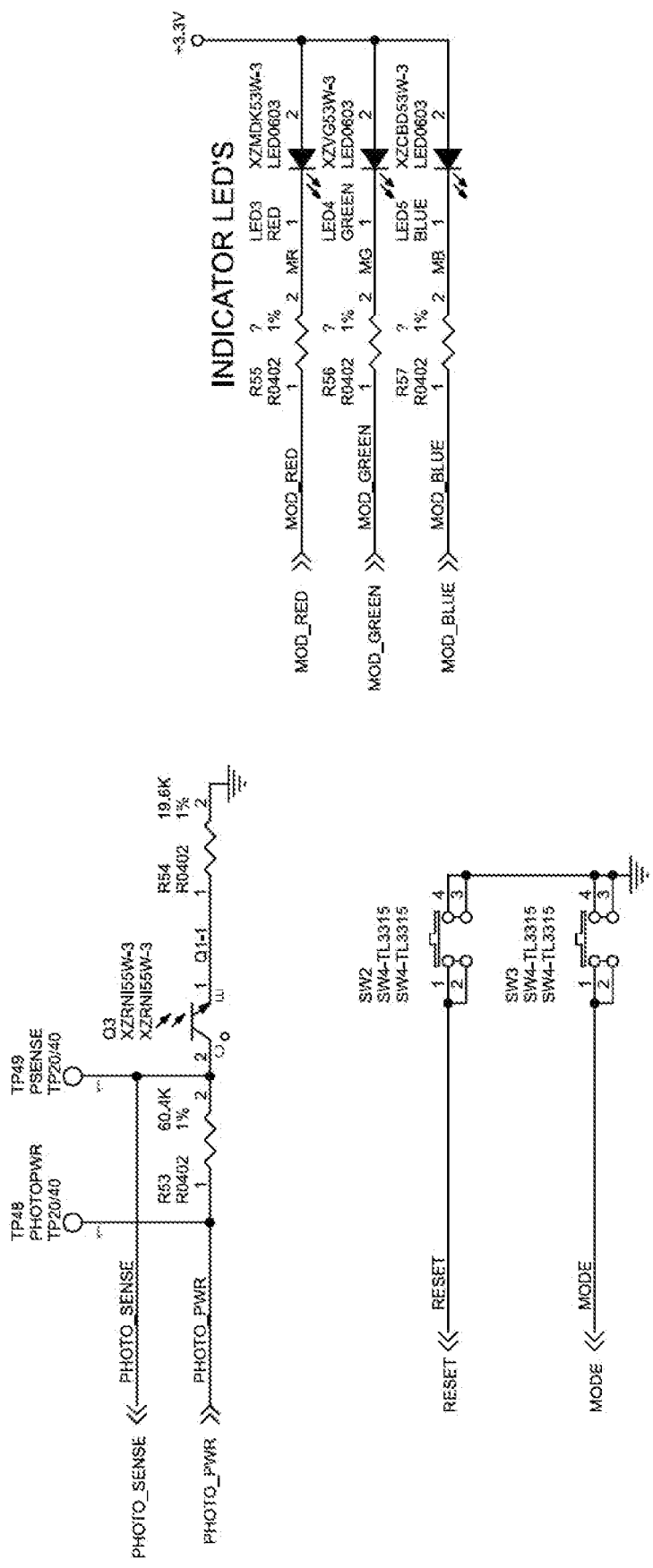
FIG. 16 is an electrical diagram of example switches and LED indicators used during testing and production assembly of component useable in devices of the present disclosure.

FIG. 16 describes tactile switches, indicator LEDs, and photo sensing circuitry (Q3). These components are used during assembly and final testing of the circuit board prior to production and insertion into the sealed enclosure.

Additional Embodiments

Optional Camera Useable to Identify Cause of Impact Event: In some embodiments of the device 340 which incorporate an optional camera, the camera may be configured to provide videotape or sequential still photos of vehicles or other causes of an impact event. In some applications, a camera that takes sequential still photos may be more desirable than a video camera because sequential still photos may consume less power and use less data transmission. If the device 340 is equipped with an optional camera that is configured to obtain an image of the license plate LP and/or driver of the vehicle V that impacts the object OB, such information can be used for purposes of imposing financial or legal responsibility on the owner or driver of the vehicle V. This feature provides significant economic incentive for the entity financially responsible for replacing or repairing the infrastructure. In some embodiments, the optional camera of the device 340, rather than capturing a video loop or continuous video, may take a still snapshot at approximately 200 milliseconds intervals, for example, of the approach to the cushion. In other embodiments, the camera can capture images at intervals greater than 200 milliseconds or at intervals less than 200 milliseconds. The 200-millisecond period would continue, with, for example, 5 photographs saved; each new photograph would "push" out the photograph taken 1000 milliseconds earlier. In this embodiment, five photographs are saved. In other embodiments more than five or less than five photographs are saved. The processor may further comprise or access non-transitory memory such as a memory card, for example, and the processor may be programmed to store some number (e.g., 5, more than 5 or less than 5) of snapshots taken by the camera prior to an impact event, thereby capturing the license plate and/or driver photo. These photographs may subsequently be downloaded from the device 340 or may be transmitted by the transmitter(s) to the cloud-based remote location and delivered to the PC Dashboard or smartphone, software applications or other suitable applications. Should the sensor(s) be destroyed by the impact and unable to connect to the cellular system, the non-transitory memory (e.g., memory card) may be shielded, enclosed or otherwise protected so that it is not destroyed by the impact and the stored photographs may still be recovered and used.

Revenue Recovery: Revenue recover addressing the cost of damage due to a driver's impacting a crash cushion is of major interest to states and municipalities. Alternative approaches to revenue recover, requiring identification of the vehicle, can include pairing to the drivers Bluetooth® phone or to the vehicle's unique Bluetooth address, or to the vehicle's electronic toll collection device. Upon impact, the impact sensor device can document the unique address of Bluetooth devices that are within range for more than 3 seconds, for example. Cars driving by at speed will be in Bluetooth range for milliseconds or 1 or 2 seconds. If a vehicle strikes the crash cushion and temporarily comes to a stop, the Bluetooth identification would be pinged for several seconds. This could be an indication that the Bluetooth address is related to the vehicle that struck the attenuator. Similarly, future vehicles will have unique electronic—Radio Frequency—identifiers for parking meters, tollways (Fasttrack, e.g.).

Alternatives to driver identification: The sensor can use Bluetooth protocol to capture the unique identifier of either the vehicle's Bluetooth address or the driver's smartphone Bluetooth address. In the case of the vehicle, this will provide a make and model of the vehicle, as these are uniquely programmed by the vehicle manufacturer to represent the model. The driver's mobile phone Bluetooth address, while not providing look-up capability (as these are not codified), can be used if the driver is subsequently identified using other means and impact can be verified by the Bluetooth address captured by the sensor. For example, should a vehicle impact a cushion and back up to drive off, the Bluetooth address of the vehicle and the phone will be in proximity to the sensor for a period exceeding a standard drive-by. If impact occurs and a Bluetooth address is identified for several seconds, it can be established that they are linked together.

Fast-Track identification: With any required permission or statutory authorization, police could identify a vehicle through the unique electronic toll collection or fast-track address. The crash cushion sensor could monitor for Fast-Track sensors to identify the car upon impact.

Future Autonomous Vehicles: Future autonomous vehicles will transmit unique identifies for a variety of reasons. The sensor on the cushion or located elsewhere on the highway can monitor the vehicle's ID and send information to the cloud-based network and server dashboard, or directly to the vehicle for processing location and provide an alert of potential object to avoid. The sensor nodes on the highway, providing GNSS location via direct-to-vehicle link or sensor (node) to gateway-to-cloud to vehicle cloud back to the vehicle to offer precise mapping data of roadway assets and obstacles.

Departments of Transportation: The sensors, in addition to transmitting their "health status" (battery voltage, temperature, location, for example) can also emit a radio or other electromagnetic spectrum signals to alert autonomous vehicles to the presence of a potential danger. Future autonomous vehicles may receive infrastructure-to-vehicle radio or electromagnetic signal information, or, the sensor can transmit their information regarding an asset to the Gateway 200/300 and to the Cloud. This information can then be delivered to the autonomous vehicle via cellular-cloud-to-vehicle. One alert can be in the short wavelength infrared spectrum indicating a difference in heat between an object or structure on the road versus the ambient temperature. Autonomous vehicles currently use and will likely in the future continue to use Forward Looking Infrared (FLIR) to identify objects. Sensors and other delineators or work zone assets can be tagged with heat sources or infrared generators in the wavelength of on-board sensors used on the vehicle. In a similar fashion, temporarily deployed visible LED flares can include an infrared source in the proper spectrum to emit not only visible light but infrared energy denoting heat.

Quality Monitoring and inspection: Crash cushions should be inspected following an impact and periodically even absent a history of impact. A smart phone associated with an inspector and an appropriate application tied to this system, using a geo-fencing concept, could document the time of day, date, and location to log that the inspector drove close enough to the cushion for visual inspection such that the smartphone is located within a specified distance (for example, approximately 10 meters) from the device 10. This eliminates the need for paper logging and data entry.

Integration with State Department of Transportation Traffic Management Systems: Each state DOT maintains a traffic management system TMS) to monitor major roadways for road conditions, accidents, traffic, etc. Rather than each state having to monitor safety devices using a dashboard linked to the devices described herein, the data generated by this invention can be forwarded from the gateway to the cellular network and using an Application Program Interface (API) delivered to the pre-existing TMS. This helps to consolidate the state's traffic monitoring into a single source for personnel to observe.

Terminology

It is to be appreciated that, although the invention has been described hereabove with reference to certain examples or embodiments of the invention, various additions, deletions, alterations, and modifications may be made to those described examples and embodiments without departing from the intended spirit and scope of the invention. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any invention or example described herein may optionally exist or be utilized in the absence or substantial absence of any other element, step, member, component, composition, reactant, part or portion unless otherwise noted. All reasonable additions, deletions, modifications and alterations are to be considered equivalents of the described examples and embodiments and are to be included within the scope of the following claims.

CLAIM STATEMENTS

The following claim statements are set forth, generally in patent claim format, to further disclose, specify and define some, but not all, potentially claimable aspects of the present invention.

We claim:

1. A device configured for attachment to or positioning near a fixed safety asset that includes a crash attenuator, a crash cushion, or a cable barrier to detect a force applied to the fixed safety asset, a plurality of devices forming an array, the array and a gateway forming a local network, each device comprising:

at least one impact sensor located on the fixed safety asset to sense an impact on the fixed safety asset, the at least one impact sensor configured to send indication of the impact;

a transmitter circuitry; and a processor and memory storing executable instructions that when executed cause a processor to receive the indications of the impact from the at least one impact sensor and transmit to one or more remote locations via the transmitter circuitry, messages that include at least event data responsive to the received indications of the impact;

wherein the transmitter circuitry is operative to automatically transmit radio frequency signals from one device to one or more neighbor devices in the array of the devices, without reference to a common reference signal, such that each device in the array of devices synchronizes transmit and receive time intervals and establishes low-power connectivity with at least one neighbor device in the array of devices to pass status through the array to be received by the gateway.

2. The device of claim 1, wherein the gateway comprises sensing circuitry and a cellular or fiber optic connection to a cloud network.

3. The device of claim 1, wherein the gateway comprises an impact sensor and cellular or fiber optic connectivity.

4. The device of claim 1 wherein establishing low-power connectivity comprises performing low-duty cycle transmit and receive periods to coordinate clock signals and synchronize the transmit and receive periods using a mesh technology, wherein each device is in quiescent low-power sleep mode when not transmitting or receiving to minimizing power consumption.

5. The device of claim 4, wherein, establishing the low-power connectivity further comprises transmitting a notification upon impact to an awake neighbor device that is configured to receive and forward the message.

6. The device of claim 1, wherein the processor, upon interrupt notification of impact by the impact sensor, is configured to sample acceleration data at the moment of impact at a frequency of many times per second for several seconds to either process locally on the device, or transmit the sampled acceleration data to a cloud server for post-event processing.

7. The device of claim 6, wherein the cloud server or the device collects the sampled acceleration data and calculates an area-under-the-curve of time and magnitude of acceleration based on the collected acceleration data.

8. The device of claim 7, wherein the cloud server or the device determines a true impact by comparing the area-under-the-curve of time and magnitude of acceleration to a first adjustable threshold and comparing and a maximum value of acceleration to a second adjustable threshold.

9. The device of claim 1 wherein a mesh network comprises the array of devices, wherein the mesh network further comprises a gateway.

10. The device of claim 9 wherein the gateway is configured to connect the mesh network to a cloud server using fiber optics.

11. A system to detect an impact on a fixed safety asset, the system comprising:

a plurality of devices forming an array, each device of the array of devices configured for attachment to or positioning near a fixed safety asset that includes a crash attenuator, a crash cushion, or cable barrier to detect a force applied to the fixed safety asset, each device comprising at least one impact sensor located on the fixed safety asset to sense an impact on the fixed safety asset, the at least one impact sensor configured to send indications of the impact, a transmitter circuitry and a processor and memory storing executable instructions that when executed cause the processor to receive the indications of the impact from the at least one impact sensor and transmit to one or more remote locations via the transmitter circuitry, messages that include at least event data responsive to the received indications of the impact; and a gateway apparatus configured to receive radio frequency signals from the array of devices and communicate the messages to a cloud server;

wherein the transmitter circuitry is operative to automatically transmit the radio frequency signals from one device to one or more neighbor devices in the array of devices, without reference to a common reference signal, such that each device in the array of devices synchronizes transmit and receive time intervals and establishes low-power connectivity with at least one neighbor device in the array of devices to pass status through the array to be received by the gateway.

12. The system of claim 11, wherein the gateway and the array of devices form a local network.

13. The system of claim 11, wherein the cloud server is configured to analyze the event data.

14. The system of claim 11 wherein establishing low-power connectivity comprises performing low-duty cycle transmit and receive periods to coordinate clock signals and synchronize the transmit and receive periods using a mesh technology, wherein each device is in quiescent low-power sleep mode when not transmitting or receiving to minimizing power consumption.

15. The system of claim 14, wherein, establishing the low-power connectivity further comprises transmitting a notification upon impact to an awake neighbor device that is configured to receive and forward the message.

16. The system of claim 11, wherein the processor, upon interrupt notification of impact by the impact sensor, is configured to sample acceleration data at the moment of impact at a frequency of many times per second for several seconds to either process locally on the device, or transmit the sampled acceleration data to a cloud server for post-event processing.

17. The system of claim 16, wherein the cloud server or the device collects the sampled acceleration data and calculates an area-under-the-curve of time and magnitude of acceleration based on the collected acceleration data.

18. The system of claim 17, wherein the cloud server or the device determines a true impact by comparing the area-under-the-curve of time and magnitude of acceleration to a first adjustable threshold and comparing and a maximum value of acceleration to a second adjustable threshold.

19. The system of claim 11 wherein a mesh network comprises the array of devices, wherein the mesh network further comprises the gateway.

20. The system of claim 11 wherein the at least one impact sensor comprises an accelerometer.

* * * * *